# (12) United States Patent
Sachs et al.

(10) Patent No.: US 7,961,875 B2
(45) Date of Patent: Jun. 14, 2011

(54) MEANS AND METHOD FOR CIPHERING AND TRANSMITTING DATA IN INTEGRATED NETWORKS

(75) Inventors: Joachim Sachs, Aachen (DE); Ian Herwono, Stowmarket (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 818 days.

(21) Appl. No.: 11/914,292

(22) PCT Filed: May 16, 2005

(86) PCT No.: PCT/SE2005/000698
§ 371 (c)(1),
(2), (4) Date: Nov. 13, 2007

(87) PCT Pub. No.: WO2006/123974
PCT Pub. Date: Nov. 23, 2006

(65) Prior Publication Data
US 2008/0192925 A1    Aug. 14, 2008

(51) Int. Cl.
*H04K 1/00* (2006.01)
*H04L 9/00* (2006.01)

(52) U.S. Cl. .................... 380/29; 380/279; 380/270

(58) Field of Classification Search .......... 380/29
See application file for complete search history.

(56) References Cited

U.S. PATENT DOCUMENTS

| | | | | |
|---|---|---|---|---|
| 5,835,592 A * | 11/1998 | Chang et al. | ................. | 380/285 |
| 7,577,256 B2 * | 8/2009 | Vialen et al. | ................. | 380/274 |
| 7,609,837 B2 * | 10/2009 | Bennett | ....................... | 380/262 |
| 7,627,113 B2 * | 12/2009 | Surendran et al. | ............... | 380/28 |
| 7,734,049 B2 * | 6/2010 | Niemi et al. | ................... | 380/270 |
| 2003/0081783 A1 * | 5/2003 | Adusumilli et al. | .......... | 380/270 |
| 2004/0160903 A1 * | 8/2004 | Gai et al. | ....................... | 370/254 |
| 2004/0236965 A1 * | 11/2004 | Krohn | ........................... | 713/201 |
| 2004/0247124 A1 | 12/2004 | Kamachi | | |
| 2005/0015583 A1 * | 1/2005 | Sarkkinen et al. | ............ | 713/150 |
| 2005/0111658 A1 * | 5/2005 | Ida et al. | ......................... | 380/28 |
| 2005/0277434 A1 * | 12/2005 | Tuomi et al. | .................. | 455/509 |
| 2006/0177050 A1 * | 8/2006 | Surendran et al. | ............... | 380/28 |
| 2006/0230274 A1 * | 10/2006 | Surendran et al. | ............ | 713/176 |

FOREIGN PATENT DOCUMENTS

| WO | WO 03/036908 A1 | 5/2003 |
|---|---|---|
| WO | WO 03/105007 A1 | 12/2003 |
| WO | WO 2004/006532 A1 | 1/2004 |

* cited by examiner

*Primary Examiner* — David García Cervetti

(57) ABSTRACT

The invention provides a method for ciphering and transmitting data, to be used by a communication device being arranged to transmit data through a first data port (241, 2002) according to a first transmission protocol, and to form ciphered exploiting a ciphering algorithm being fed with a first set of ciphering parameters, comprising a ciphering parameter CP5; said device being further arranged to transmit data through a second data port (242, 2003) according to an alternative transmission protocol, said method comprising the steps of: defining an alternative ciphering parameter, ACP, having a bit length equal to the bit length of CP5, forming a second set of ciphering parameters by substituting said CP5 with said ACP in said first set of ciphering parameters, forming ciphered data by subjecting the data to said ciphering algorithm being fed with said second set of ciphering parameters, transmitting said ciphered data through said second data port (242, 2003). The invention also provides a software program and communication devices realising said method.

12 Claims, 15 Drawing Sheets

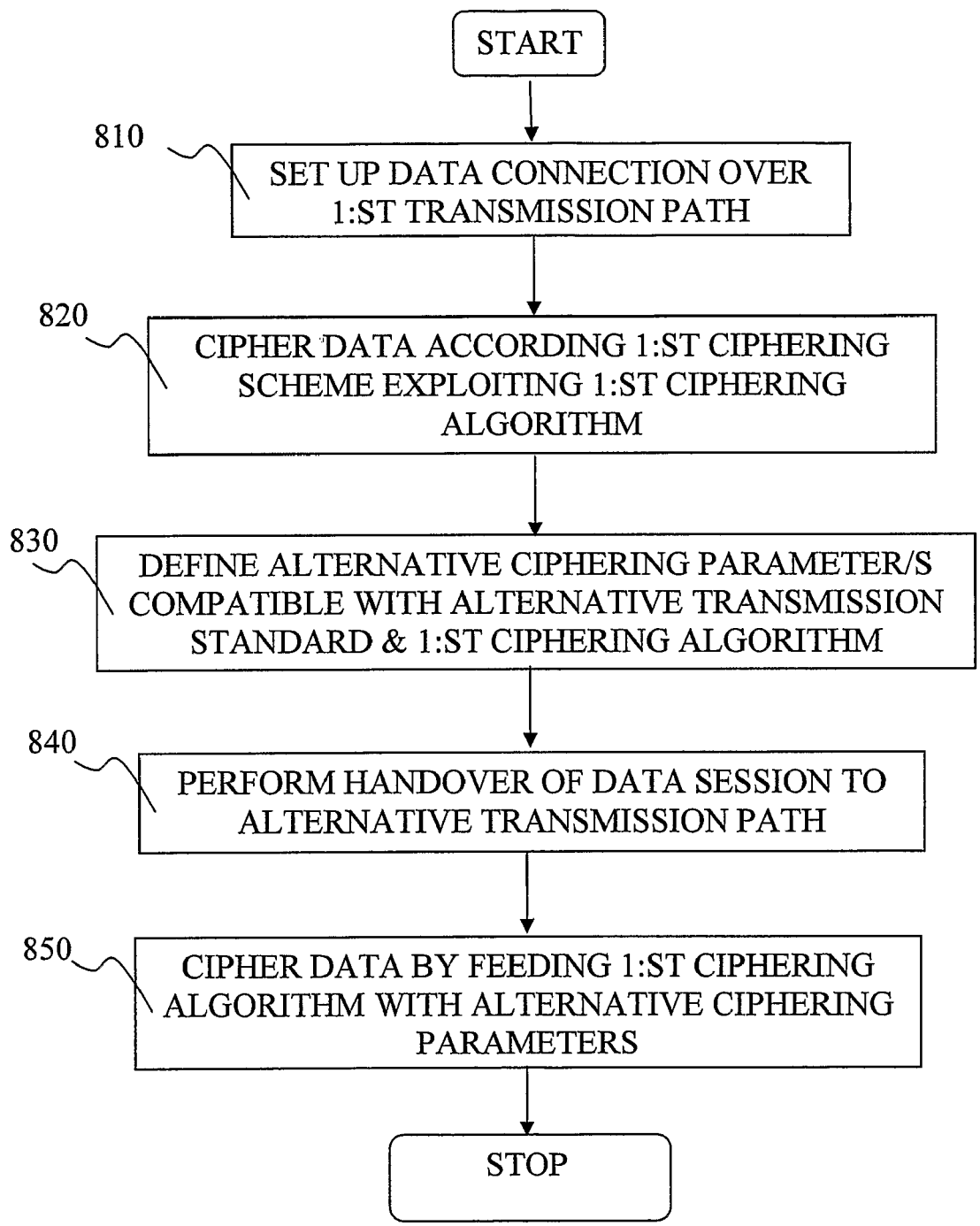

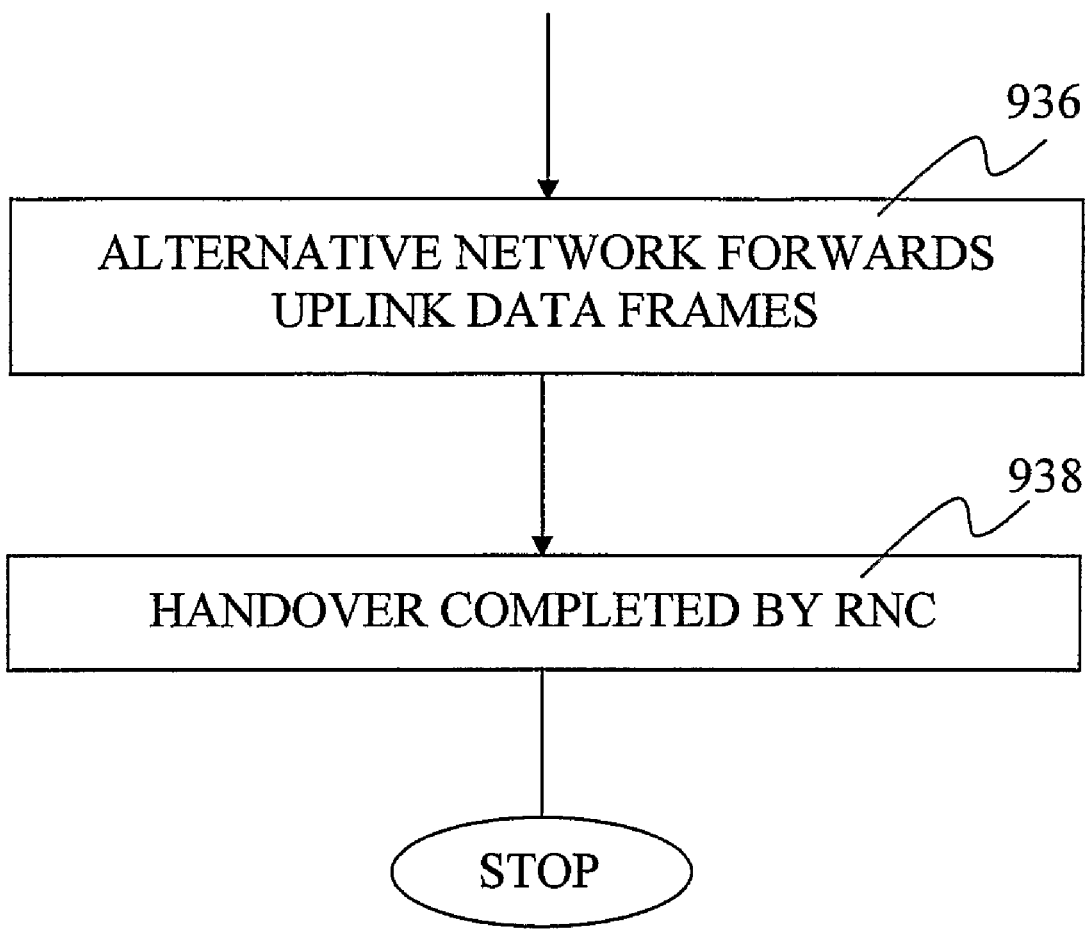

MEANS AND METHOD FOR CIPHERING AND TRANSMITTING DATA IN INTEGRATED NETWORKS

TECHNICAL FIELD OF THE INVENTION

The invention relates generally to the internetworking of cellular radio networks and wireless data networks, and more specifically to means and methods for ciphering and transmitting data in such integrated networks.

BACKGROUND

FIG. 1 illustrates the basic architecture of a cellular radio network in form of a UTRAN (Universal Terrestrial Radio Access Network) network, connected to the Internet 170 and a WLAN. The WLAN normally comprises at least one radio Access Point, AP, 165 connected to an Access Point Controller, APC, 162. The cellular radio network comprises a GGSN 110 connected to a SGSN 120 which in turn is connected to a RNC 130. A dual mode UT (User Terminal) 140, having both UTRAN and WLAN capability, can establish a UTRAN radio connection through it's first data port 141 with Base station Node B 150 and a WLAN radio connection through it's second data port 142 with the AP 165 of the WLAN. Node B 150 is connected to RNC 130. The WLAN may in a conventional manner be connected to the SGSN 120 or to the GGSN 110 or to the Internet 170, FIG. 1 illustrates the case wherein it is connected to the GGSN 110, possibly via an AR (Access Router) and/or an IP-network, not illustrated in FIG. 1. A data communication session can be established between the UT 140 and a communicating party connected to the Internet 170, e.g. by means of a conventional PDP (Packet Data Protocol) context session between the UT 140 and the GGSN 110, in accordance with the 3GPP standard for packet radio data services.

In case of a handover of a data session from the UTRAN transmission path to the WLAN transmission path, session data will be encrypted according to the WLAN security protocol exploiting the WLAN specific encryption algorithm and parameters. The set up of these parameters, e.g. the security keys during the AAA (Authentication, Authorization, Accounting) process, is time consuming, hindering an efficient and smooth handover of a data session from the UTRAN transmission path to the WLAN transmission path. This is particularly a problem for real time applications, such as e.g. telephone speech applications.

Different encryption standards in an integrated network require differentiated software management (installation, updates etc), which constitutes a problem regarding cost efficiency.

Another problem is that the WLAN security is generally considered rather weak, which hinders the full commercial exploitation of integrated WLAN/UTRAN networks.

Another important problem is that WLAN networks are so called pico-cell hotspot networks. This means that access points are placed at many locations with small cells which are to a large extent easily accessible. Even if the WLAN encryption between UT:s and AP:s (Access Points) over the radio link is relatively safe, there is no encryption of the data transmitted between AP:s and the fix parts of the WLAN, e.g. between AP 165 and APC 162 in FIG. 1, which of-course constitutes a security problem. This is illustrated in FIG. 1 wherein the encrypted connections in the WLAN and UTRAN routing paths are indicated with bold lines, the fact that parts of the WLAN connections not are encrypted hinders the full commercial exploitation of integrated WLAN-UTRAN networks.

None of the above identified problems are admitted by the applicant to constitute prior art.

SUMMARY OF THE INVENTION

The present invention seeks to overcome/solve above problems.

It is an object of the invention is to provide means and methods improving the security in a wireless data network, e.g. a WLAN or WLAN-IP-Network, integrated with cellular radio network, e.g. a UTRAN.

Another object of the invention is to provide an encryption scheme allowing a smooth handover of a data session from a cellular network transmission path to a wireless data network transmission path, in a cellular radio network, e.g. a UTRAN, integrated with a wireless data network, e.g. a WLAN or WLAN-IP-Network.

According to a first aspect, the invention provides a method for ciphering and transmitting data, to be used by a communication device being arranged to transmit data through a first data port according to a first transmission protocol, and to form ciphered data by subjecting the data to a ciphering algorithm being fed with a first set of ciphering parameters, comprising a ciphering parameter, CP5, having a bit length, CP5BL; said device being further arranged to transmit data through a second data port according to an alternative transmission protocol, said method comprising the steps of:

defining an alternative ciphering parameter, ACP, having a bit length being equal to said CP5BL, forming a second set of ciphering parameters by substituting said CP5 with said ACP in said first set of ciphering parameters, forming ciphered data by subjecting the data to said ciphering algorithm being fed with said second set of ciphering parameters, transmitting said ciphered data through said second data port (242, 2003) according to said alternative transmission protocol.

In one embodiment, the method comprises the step of: defining said ACP to equal said CP5.

In one embodiment, said ciphering algorithm is an encryption algorithm and said first set of ciphering parameters is a first set of encryption parameters comprising a first encryption parameter, EP1, having a specific bit length and being a function of a parameter defined by said first transmission protocol, said device being arranged to form encrypted data by processing the data with an encryption key bit stream, EKS1, formed by said encryption algorithm being fed with said first set of encryption parameters, said method further comprising the steps of:

defining at least one alternative encryption parameter, AEP1, being a function of a parameter defined by said alternative transmission protocol and having a bit length being equal to the bit length of said EP1, forming a second set of encryption parameters by substituting said EP1 with said AEP1 in said first set of encryption parameters forming an alternative encryption key bit stream, AEKS, by feeding said encryption algorithm with said second set of encryption parameters, encrypting the data by processing the data with said AEKS.

In one embodiment, said first transmission protocol defines first data frames wherein data in each frame is associated with a number, NR1; said EP1 being a function of said NR1, and wherein said alternative transmission protocol defines alternative data frames, said method characterised in that it comprises the following steps:

defining an alternative frame number, ANR, for each of said alternative data frames, defining said alternative encryption parameter, AEP1, to be a function of said ANR.

In one embodiment, said NR1 is defined as a combination of a first hyper-frame sequence number, HYPFSN1, and a first frame sequence number, FSN1; the method further comprising the steps of:

defining an alternative frame sequence number, AFSN, for said alternative data frames, defining an alternative hyper-frame as a set of consecutive alternative frames, and assigning each alternative hyper-frame a sequence number, AHYPFSN, defining said ANR as being a combination of said AHYPFSN and AFSN.

In one embodiment, said first transmission protocol, said first set of encryption parameters and said encryption algorithm are defined according to a 3GPP standard protocol and said alternative transmission standard is a wireless data network standard according to a IEEE 802 standard protocol, and wherein said EP1 is an encryption parameter referred to as a COUNT C parameter according to the 3GPP standard, said method further comprising the following steps:

setting up a data session wherein the data is transmitted over a cellular radio network transmission path through said first data port according to the 3GPP standard, encrypting the data of said session by using an f8-algorithm defined by the 3GPP standard, setting up an alternative radio bearer identity, ARB ID 1, having a bit number value and defining a logical connection for said data session over an alternative network path according to said alternative transmission protocol standard, defining a second alternative encryption parameter, AEP2, as being a function of said value of ARB ID 1, and having a bit length being equal with a second encryption parameter, EP2, of said first set of encryption parameters, referred to as a BEARER parameter according to the 3 GPP standard, performing a handover of said data session from said cellular radio network transmission path to said alternative transmission path wherein each frame is assigned a transmitter send sequence number N(S), and data is transmitted through said second data port, defining said AFSN to be said N(S), calculating said AHYPFSN by detecting the triggering of consecutive alternative hyper-frames, defining said AEP1 as being a combination of said AFSN and AHYPFSN, forming a second set of encryption parameters by substituting said EP1 with said AEP1 and substituting said EP2 with said AEP2 in said first set of encryption parameters, forming said alternative encryption key bit stream, AEKS, by feeding said f8 algorithm with said second set of encryption parameters.

In one embodiment, said first transmission protocol, said encryption algorithm and said first set of encryption parameters are defined according to the 3GPP standard, and said alternative transmission protocol is a secure IP standard protocol, IPSec, the method further comprising the step of:

defining said ANR as being a function of a conventional IP-packet sequence number parameter, ESP-NR, residing in an IP Encapsulating Security Payload header, ESP header, wherein said header and ESP-NR are defined by the IPSec standard protocol.

In one embodiment, the method comprises the following steps:

setting up a data session connection wherein said data is transmitted over a cellular radio network path through said first data port, defining a second alternative encryption parameter, AEP2, having the same bit length as a second conventional f8 encryption parameter, EP2, performing a handover of said data session from said cellular radio network transmission path to said alternative transmission path, transmitting data through said second data port, segmenting said data in IPSec packet format and assigning each packet the ESP-NR parameter value according to the IPSec standard protocol, defining said AEP1 to be said ESP-NR, encrypting said data by substituting a 3GPP COUNT-C encryption parameter, EP1, with said AEP1, and substituting a 3GPP BEARER encryption parameter, EP2, with said AEP2, in said f-algorithm.

In one embodiment, the method comprises the step of:

setting up an alternative radio bearer identity, ARB ID 1, having a bit number value and defining a logical connection for said data session over the alternative network path according to said alternative transmission protocol standard, and defining the second alternative encryption parameter, AEP2, to be a function of said ARB ID 1.

In one embodiment, the method comprises the step of:

defining said AEP2 as being a function of a conventional SP1 (Secure Parameter Index) parameter value defined by the IPSec standard protocol.

In one embodiment, said ciphering parameters is a first set of encryption parameters which further comprises the following encryption parameters:

EP3, referred to as a DIRECTION parameter according to the 3GPP standard,

EP4, referred to as a LENGTH parameter according to the 3GPP standard,

EP5, referred to as a cipher key (CK) parameter according to the 3GPP standard, said method further comprising the steps of:

defining a third alternative encryption parameter AEP3 to equal said EP3, defining a fourth alternative encryption parameter AEP4 to equal said EP4, defining a fifth alternative encryption parameter AEP5 to equal said EP5, forming said second set of encryption parameters by substituting said EP3 with said AEP3, said EP4 with said AEP4, said EP5 with said AEP5, in said first set of encryption parameters.

In one embodiment, said data ciphering method is an authentication ciphering method; said device being arranged to form a ciphering digest from a first Radio Resource Control, RRC, message by feeding an authentication ciphering algorithm with said RRC message and a first set of authentication ciphering parameters, comprising a first authentication ciphering parameter, AP1, having a bit length, BLAP1, wherein said digest indicates the authentication of said first RRC message and wherein said first RRC message, said authentication ciphering algorithm and said first set of authentication ciphering parameters are defined by a first cellular radio network protocol; said device being arranged to transmit said digest along with said first RRC message according to said first cellular radio network protocol through said first data port (241, 2002); said device being further arranged to receive an alternative RRC message defined by an alternative transmission protocol through said second port (242, 2003), said method comprising the following steps:

associating said alternative RRC message with an alternative message sequence number, AMSNR, defining at least one alternative ciphering parameter, AAP1, as being a function of said AMSNR and having a bit length being equal with said BLAP1, forming a second set of authentication ciphering parameters by substituting said AP1 with said AAP1 in said first set of authentication parameters, forming an alternative digest associated with said alternative RRC message by feeding said authentication ciphering algorithm with said second set of authentication ciphering parameters, transmitting said alternative RRC message along with said alternative digest through said second data port according to said alternative transmission protocol.

In one embodiment, said first transmission protocol is a 3GPP standard protocol, said authentication ciphering algorithm is an f9 algorithm defined by the 3GPP standard, said authentication ciphering parameters are defined according to the 3 GPP standard, and wherein said AP1 is a parameter referred to as a COUNT-I parameter according to the 3GPP standard, and wherein said alternative protocol is an IEEE 802 standard protocol or an IPSec standard protocol, said method further comprising the steps of:

defining a second alternative authentication ciphering parameter AAP2 to equal a second 3GPP authentication parameter AP2 referred to as a FRESH parameter according to 3GPP, defining a third alternative authentication ciphering parameter AAP3 to equal a third 3GPP authentication parameter AP3 referred to as a DIRECTION parameter according to 3GPP, defining a fourth alternative authentication ciphering parameter AAP4 to equal a signalling message according to said alternative transmission protocol, defining a fifth alternative authentication ciphering parameter AAP5 to equal a fifth 3GPP authentication parameter AP5 referred to as an integrity key (IK) parameter according to 3GPP, forming said second set of authentication ciphering parameters by substituting said AP2 with said AAP2, said AP3 with said AAP3, said AP4 with said AAP4, said AP5 with said AAP5, in said first set of encryption parameters.

According to a second aspect, the invention provides a computer program product comprising program code means which, when loaded into a processing means of a communication device, make said processing means execute at least one procedure realising the method according to the invention.

In one embodiment, said computer program product comprises a computer readable medium having said program code means stored thereon.

According to a third aspect, the invention provides a User Terminal, UT, being arranged to transmit data through a first data port according to a first transmission protocol, and to form ciphered data by subjecting the data to a ciphering algorithm being fed with a first set of ciphering parameters compatible with said first transmission protocol; said UT being further arranged to transmit data through a second data port according to an alternative transmission protocol, said UT comprising means for carrying out the method according to the invention.

In one embodiment, the UT comprises data storage means having stored program code means, and comprising processing means which, when said program code means is loaded into said processing means, make said processing means execute at least one procedure realising the method according to the invention.

According to a fourth aspect, the invention provides a Radio Network Controller, RNC, being arranged to transmit data through a first data port according to a first transmission protocol, and to form ciphered data by subjecting the data to a ciphering algorithm being fed with a first set of ciphering parameters compatible with said first transmission protocol; said RNC being further arranged to transmit data through a second data port according to an alternative transmission protocol, said RNC comprising means for carrying out the method according to the invention.

In one embodiment, the RNC comprises data storage means having stored program code means, and comprising processing means which, when said program code means is loaded into said processing means, make said processing means execute at least one procedure realising the method according to the invention.

Even though the invention has been summarised above, the invention is defined by the accompanying claims 1-18.

BRIEF DESCRIPTION OF THE DRAWINGS

The features and advantages of the present invention will become more apparent from the following detailed description of the preferred embodiments with reference to the accompanying drawings, wherein:

FIG. 8 is a flow chart illustrating the method according to the invention.

DETAILED DESCRIPTION OF PREFERRED EMBODIMENTS

The present invention will here be described for the specific case that the cellular radio network is a UTRAN and that the alternative Wireless Data Network is a WLAN, i.e. in accordance with the IEEE 802.11 standard, but the invention is applicable for any cellular radio network integrated with any alternative wireless data network, e.g. any Layer 2 Radio Network (L2-RN) in accordance with the IEEE 802 standard protocol family, such as Wireless Personal Area Networks (WPAN, IEEE 802.15), Wireless Metropolitan Area Networks (WMAN, IEEE 802.16), Mobile Broadband Wireless Access (MBWA, IEEE 802.20), Wireless Regional Area Networks (WRAN, IEEE 802.22) etc. Furthermore, as an illustrative example, the UTRAN is connected to the Internet via an intermediate UMTS (Universal Mobile Terrestrial System) network.

Figure 1:
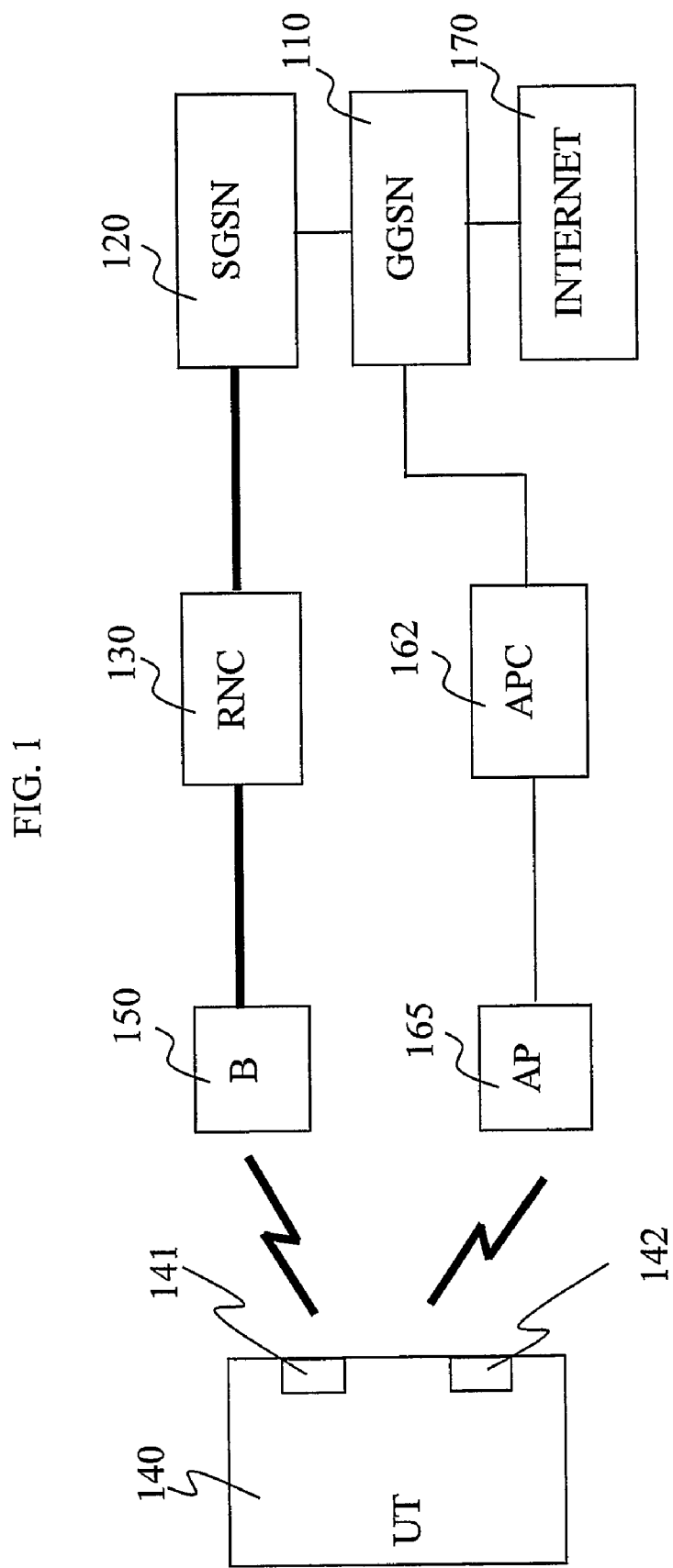
FIG. 1 illustrates a known integrated UTRAN-WLAN network architecture.
Figure 2:
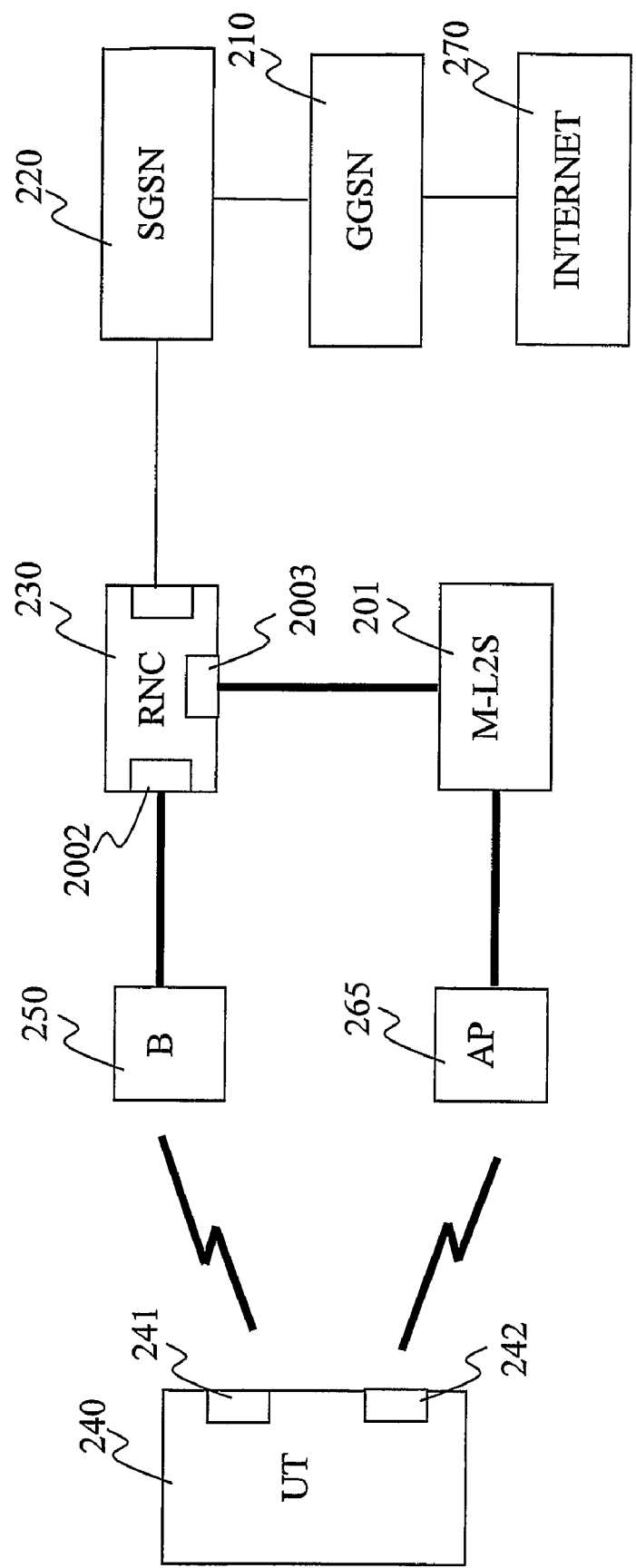
FIG. 2 illustrates an integrated UTRAN-WLAN network architecture according to one embodiment of the present invention.
Figure 5:
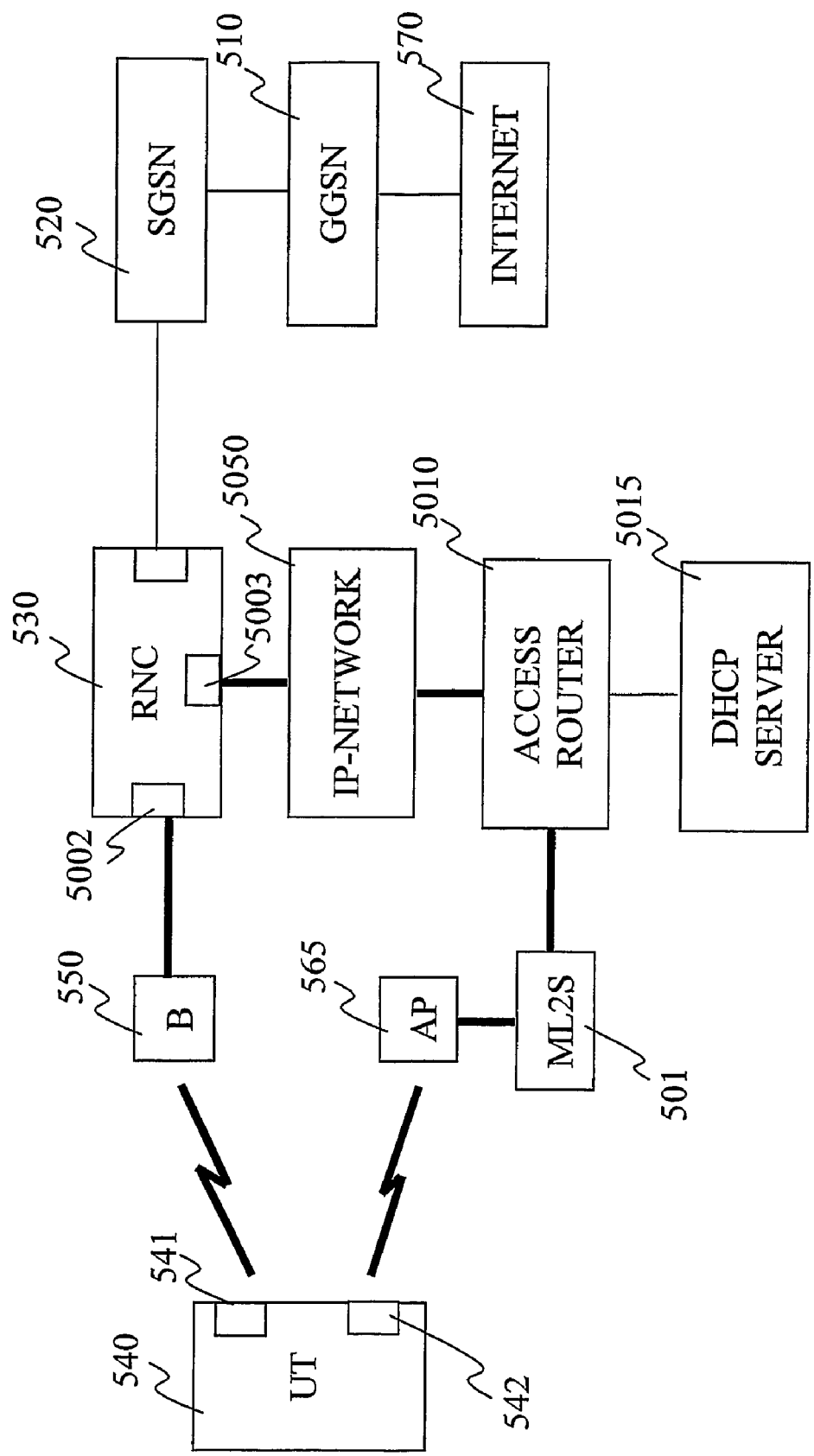
FIG. 5 illustrates an integrated UTRAN-WLAN-IP-Network architecture according to an alternative embodiment of the present invention FIG. 6. illustrates an example of the protocol stacks and software applications of the network illustrated in FIG. 5

Each element has been given the same reference number in the Figures along with a figure prefix number, e.g. the RNC 230 in FIG. 2 is referred to as RNC 530 in FIG. 5 etc.

FIG. 2 illustrates the architecture of an UTRAN-WLAN-integrated network 200 according to one embodiment of the present invention, connected to the Internet 270. The WLAN:s conventional layer 2 Ethernet switches are hereafter referred to as M-L2S:s (Multicast-enabled Layer 2 Switches). Since the Ethernet (IEEE 802.3) protocol is used for most of the WLAN:s layer 2 protocol to communicate with fixed network infrastructure, an M-L2S is identical with an Ethernet switch. In FIG. 2, the RNC 230 is connected with the M-L2S 201, and the M-L2S 201 is connected to the Access Point, AP, 265, however, many possibilities exist. A plurality of AP:s may e.g. be connected directly to the RNC (230) or to a plurality of intermediate M-L2S:s connected to the RNC 230. There may be several M-L2S:s in the transmission path between an AP and an M-L2S. Normally, in order to facilitate distributing or multicasting layer 2 messages within the WLAN, the RNC (230) is connected to the WLAN through one single M-L2S. The RNC 230 is normally connected to further RNC:s in a conventional manner, illustrated by RNC 231 in FIG. 2, which in turn may be connected to their respective WLAN, e.g. via M-L2S:s. The RNC 230 is connected to the SGSN 220 through the RNC data port 2001, and with the Node B 250 through the RNC data port 2002. The SGSN 220 is connected to the GGSN 210 which in turn is connected to the Internet 270. According to the invention, the RNC 230 is further connected with the M-L2S 201 through the RNC data port 2003. The AP 265 is connected with the M-L2S 201. The dual mode/capability UT 240 can establish a WLAN radio connection with the AP 265 of the layer 2 WLAN network through its data port 242. In a conventional manner, specific applications or protocols may share a common physical data port, defined by a MAC (Media Access Control) protocol layer. Normally however, the data ports 2001, 2002 and 2003 are associated with physically separated contacts, e.g. data port 2003 is associated e.g. with a separate Ethernet contact. The RNC 230, port 2002 of RNC 230, base station node B 250, port 241 of UT 240 and UT 240 define a first access network and a first transmission path, i.e. a cellular radio network transmission path realised in form of a UTRAN, of a data session, such as a PDP context session. The RNC 230, port 2003 of RNC 230, M-L2S 201, the AP 265, port 242 of UT 240 and UT 240 define an alternative access network and an alternative transmission path, i.e. a wireless data network transmission path realised in form of a WLAN, of a data session, such as a PDP context session.

The functionality e.g. regarding routing, radio resource management etc., of e.g. the UT 240, the RNC 230, the M-L2S 201 and the AP 265 in FIG. 2 is normally realised by protocol stacks and software applications loaded in processing means, e.g. CPU:s at the UT 240, the RNC 230, the M-L2S 201 and the AP 265.

Referring back to FIG. 2, a data communication session between the UT 240 and a second party, e.g. a peer or a host on the Internet 270, is normally carried out by means of a PDP context session between the UT 240 and the GGSN 210. A PDP context session between the UT 240 and the GGSN 210 can be established in different conventional ways, e.g. on the initiative of the UT 240, by having the UT 240 sending a PDP context request along with one of it's (unused) NSAPI (Network layer Service Access Point Identifier), which is a standard 3GPP identifier, transparently to the GGSN 210, i.e. the RNC 230 and SGSN 220 forwards the request to the GGSN 210. The GGSN 210 then initiates the PDP context session set up by performing various signalling with the SGSN 220 and the RNC 230 in a conventional manner, with the result that one GTP-U tunnel is set up between the GGSN 210 and the SGSN 220 and another GTP-U tunnel is set up between the SGSN 220 and the RNC 230. Each GTP-U tunnel is identified by its TEID (Tunnel Endpoint Identifier). The SGSN 220 then requests the RNC 230 to assign a unique 3GPP RAB ID (Radio Access Bearer Identity, according to the 3GPP standard), which is also stored in the SGSN 220. The RNC 230 thereafter also assigns a unique 3GPP RB ID (Radio Bearer Identity, according to the 3GPP standard), for the PDP context session in question. The PDP context session is characterised by the assigned IP address and QoS profile (and possibly also a specific Traffic Flow Template, TFT) and may be uniquely associated e.g. with the UT:s NSAPI and/or the TEID of the GTP-U tunnel between the RNC 230 and the SGSN 220, in the RNC 230. What is important according to the invention is that the RNC 230 uses a session identifier which unambiguously and uniquely identifies the data session in question, i.e. the PDP context session in this case, for routing the session. Normally, the RNC 230 uses the TEID as a session identifier for routing purposes. The NSAPI is used on a temporary basis, i.e. it may be reused for other sessions. Thus, in a PDP context session, data packets are tunnelled by the GTP-U protocol between the GGSN 110 and the SGSN 120, and between the SGSN 120 and the RNC 130. The packets are decapsulated in the RNC 130 and further tunnelled to the UT 140 by using the 3G-PDCP protocol between the RNC 130 and the UT 140. More specifically, the RNC 230 routes the packets to the accurate UT by binding the TEID of the GTP-U tunnel between the RNC 230 and the SGSN 220 to said 3GPP RAB ID in a one-to-one relationship, and then binds the RAB IB to the 3GPP RB ID in a one-to-one relationship, in a conventional manner. The 3GPP RAB ID is a conventional identifier defining the logical connection for the data session between the UT 240 and the SGSN 220 and the 3GPP RB ID is a conventional identifier uniquely defining the physical UTRAN communication connection between the RNC 230 and the UT 240. Thus, in the RNC 230, there is a one-to-one relationship between the TEID, the RAB ID and the RB ID for a specific PDP context session. The RNC 230 binds the session specific 3GPP TEID to the session specific 3GPP RAB ID and the 3GPP RAB ID to the session specific 3GPP RB ID in a one to one relationship in order to route the PDP context data (up-link and down link) between the UT 240 and the GGSN 210 correctly, in a conventional manner. An illustrative example of (part of) a conventional routing table for PDP context session routing, used by the RNC 230, is illustrated in Table 1. As illustrated in Table 1, one UT may have a plurality of ongoing PDP context sessions, each uniquely identified by a specific RB ID, a specific RAB ID and a specific TEID at the RNC (230).

TABLE 1

| PDP Session | 3GPP RB ID | 3GPP RAB ID | UT | TEID | GTP-U |
|---|---|---|---|---|---|
| Session 1 | RB ID 1 | RAB ID 1 | UT 1 | TEID 1 | GTP-U 1 |
| Session 2 | RB ID 2 | RAB ID 2 | UT 1 | TEID 2 | GTP-U 2 |
| Session N | RB ID N | RAB ID N | UT K | TEID N | GTP-U N |

In a similar manner, table 2 shows (part of) the identifiers involved for conventional PDP context session management at the UT 240. The 3GPP RAB ID and 3GPP RB ID at the UT 240 are identical with the 3GPP RAB ID and 3GPP RB ID at the RNC (230), and hence uniquely identify the data session in question, i.e. the PDP context session. The UT normally uses the 3GPP RAB ID as a unique session identifier and routes PDP context session data over the cellular radio network path, i.e. the UTRAN path in this case, by binding the 3GPP RAB ID to the 3GPP RB ID. Furthermore, each PDP context session has it's own assigned NSAPI at the UT 240, in a conventional manner. The NSAPI:s are used by the UT 240 to identify to which session a specific PDP-IP-packet belong after decapsulation of the PDP-IP-packets in a conventional way.

TABLE 2

| PDP Session | 3GPP RB ID | 3GPP RAB ID | NSAPI | Application |
|---|---|---|---|---|
| Session 1 | RB ID 1 | RAB ID 1 | NSAPI 1 | Web browsing |
| Session 2 | RB ID 2 | RAB ID 2 | NSAPI 2 | E-mail |
| Session N | RB ID N | RAB ID N | NSAPI N | Multimedia download |

Figure 3:
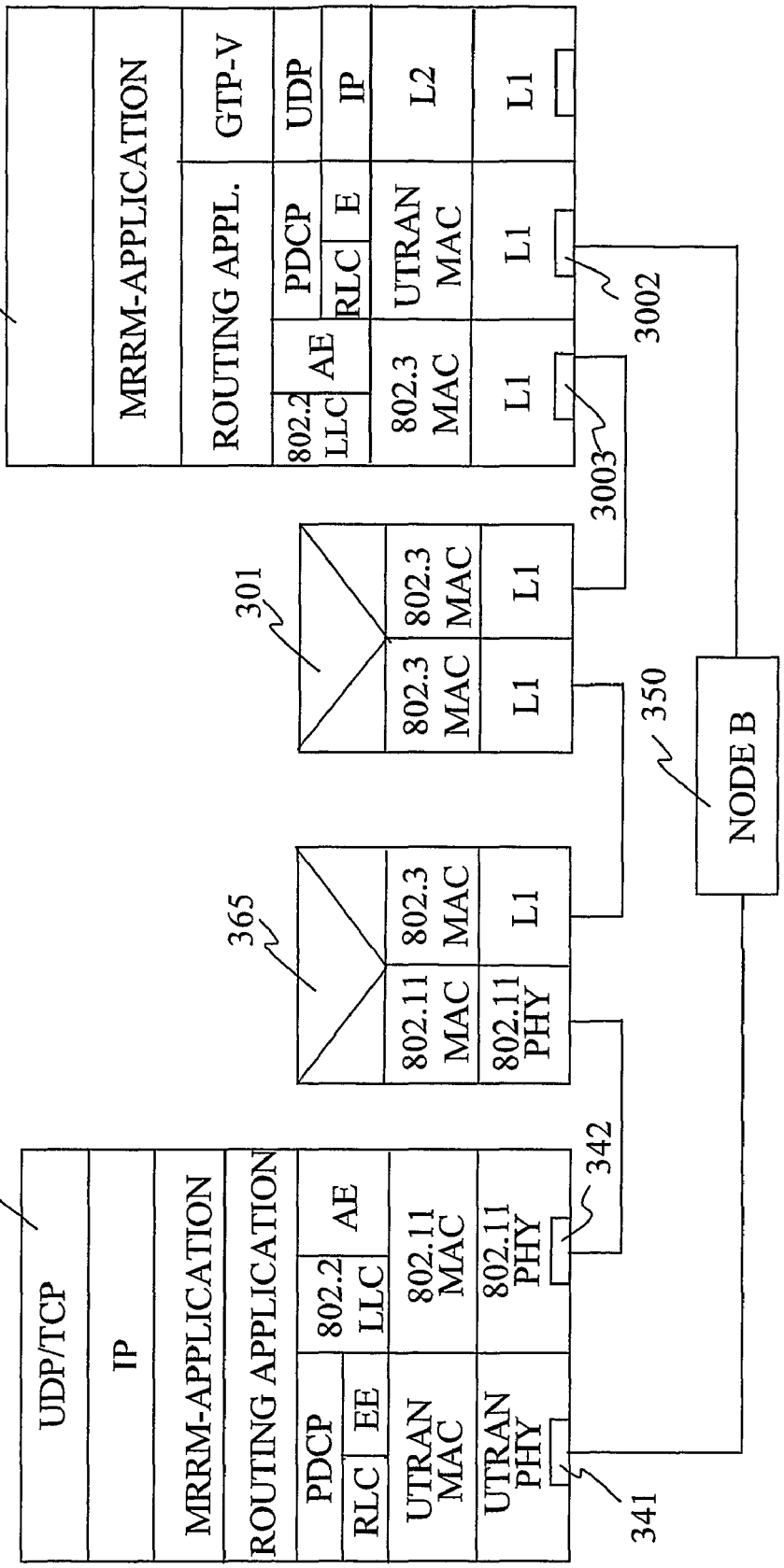
FIG. 3 illustrates an example of the protocol stacks and software applications of the network illustrated in FIG. 2

FIG. 3 illustrates an example of the protocol stacks and applications which according to the invention are used by the RNC 230, the M-L2S 201, the AP 265 and the UT 240 in FIG. 2. In FIG. 3, the RNC 330 has conventional UTRAN protocol stack installed, comprising UTRAN MAC (Media Access Control) protocol, defining data port 3002, RLC (Radio Link Control) protocol, PDCP (Packet Data Convergence Protocol), GTP-U (GPRS Tunnelling Protocol-User plane) protocol, UDP (User Datagram Protocol) and IP (Internet Protocol). According to the invention, the RNC 330 further has an Ethernet- and WLAN-protocol stack installed associated with data port 3003, i.e. the IEEE 802.3 MAC protocol, defining data port 3003, and the IEEE 802.2 LLC (Link Layer Control) Ethernet protocol stack. The RNC 330 has further a conventional 3GPP encryption application entity at the RLC-layer and, according to the invention, an encryption application entity at the 802.2 LLC-layer, described further below. The conventional "WLAN-part", i.e. the M-L2S 301 and the AP 365 have conventional physical layers and IEEE 802.3 & 802.11 MAC protocol layers installed. The UT 340 has a conventional UTRAN protocol, comprising a UTRAN physical layer, MAC layer, defining data port 341, RLC layer and PDCP layer. The UT 340 has also an IP protocol, a UDP/TCP and higher application protocol layers installed. According to the invention, the UT 340 has also an Ethernet- and WLAN- protocol stack installed, i.e. an IEEE 802.11 physical layer, MAC layer, defining data port 342, and 802.2 LLC layer. According to the invention, the UT 340 has a Routing application and a MRRM application installed "on top" of the LLC/PDCP/MAC layers. The UT 340 has further a conventional 3GPP encryption application entity, EE, at the RLC-layer and, according to the invention, an alternative encryption application entity, AEE, at the 802.2 LLC-layer, described further below. In a similar manner, the RNC 330 has a Routing application and a MRRM application installed "on top" of the LLC/PDCP/MAC layers. The RNC 230 has further a conventional 3GPP encryption application entity, EE, at the RLC-layer and, according to the invention, an alternative encryption application entity, AEE, at the 802.2 LLC-layer, described further below. The Routing application, the MRRM application of the UT 240 and of the RNC 230, respectively, along with the lower layers, allow the UT 240 and RNC 230 to establish logical data connections between their respective Routing and MRRM applications by conventional layer data processing. For instance, the MAC layer filters out packets intended for the physical device, the LLC layer forwards the packets to the "right" layer/application which in turn may forward the packet further up to a specific layer/application until it is received by the "right" application. The MRRM and Routing applications are according to the invention in this way arranged to communicate with each other.

Figure 4A:
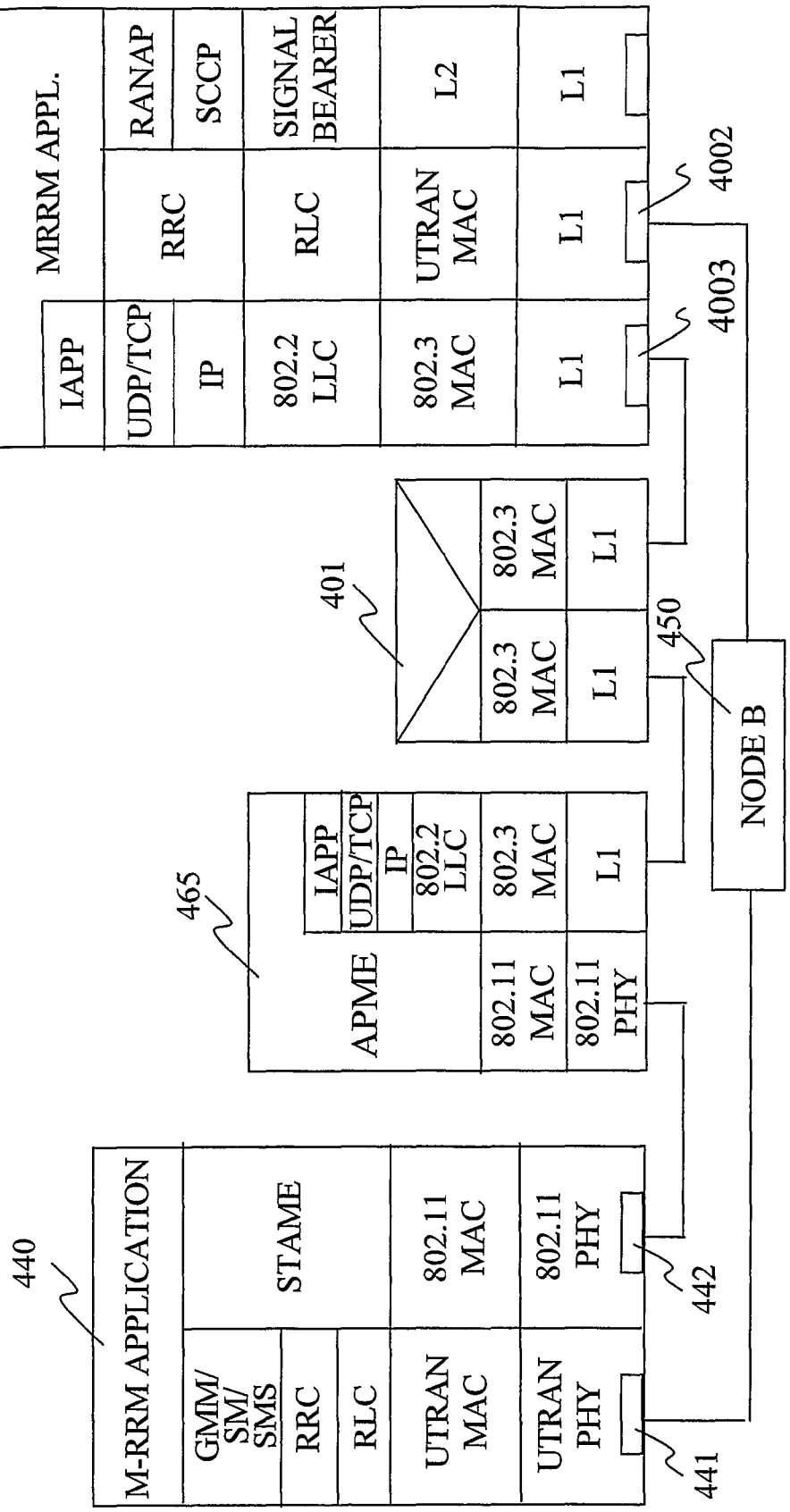
FIG. 4A illustrates an example of the protocol stacks and software applications of the network illustrated in FIG. 2.

FIG. 4A illustrates an example of the control plane protocol stacks used by the RNC 230, the M-L2S 201, the AP 265 and the UT 240 in FIG. 2. In FIG. 4, the RNC 430 has conventional UTRAN protocol stack installed, comprising a UTRAN MAC layer, defining port 4002, an RLC protocol, a signalling bearer towards the core network, a SCCP (Signalling Connection Control Part) and RANAP (Radio Access Network Application Part). According to the invention, the RNC 430 further has an Ethernet- and WLAN-protocol stack installed associated with data port 4003, i.e. the IEEE 802.3 MAC protocol, defining data port 4003, and the IEEE 802.2 LLC Ethernet protocol stack. Furthermore, according to the invention, the RNC 430 has an IP layer, a UDP/TCP layer and a conventional IAPP (Inter Access Point Protocol) installed on top of the 802.2 layer. The conventional "WLAN-part", i.e. the M-L2S 401 and the AP 465 have conventional physical layers and IEEE 802.3 and 802.11 MAC protocol layers installed. AP 465 has further an IP layer, a UDP/TCP layer and an IAPP layer installed on top of the 802.2 layer, and furthermore an APME (Access Point Management Entity) application. The UT 440 has a conventional UTRAN protocol, comprising a UTRAN physical layer, MAC layer, defining data port 442, and RLC layer. The UT 440 has also an IP protocol, a UDP/TCP and higher application protocol layers installed. According to the invention, the UT 440 has also an Ethernet- and WLAN-protocol stack installed, i.e. an IEEE 802.11 physical layer, MAC layer and 802.2 LLC layer. Furthermore, UT 440 has a STAME (Station Management Entity) application installed on top of said 802.11 MAC layer. The UT 340 has a MRRM application installed "on top" of the LLC/MAC layers. In a similar manner, the RNC 330 has a Routing application and a MRRM application installed "on top" of the LLC/MAC layers. The STAME application of UT 240 along with the APME application of AP 265 and IAPP of AP 265 and RNC 230 makes it possible for the MRRM applications of UT 240 and RNC 230 to communicate RRM information, and makes it possible for the AP 465 to communicate RRM information with UT 440 and RNC 430, as a person skilled in the art realises, but any protocol for exchanging RRM information between a network (access) node and a network control node may be used instead, as a person skilled in the art realises, e.g. a LWAPP, (Light Weight Access Point Protocol), not illustrated in FIG. 4, could be used instead of the IAPP. There is a conventional Authentication application Entity, AE, installed at the RRC layer at UT 440 and RNC 430, respectively, which AE is further described below. According to the invention, there is an Alternative Authentication application Entity, AAE, installed at the 802.2 LLC layer at UT 440 and RNC 430, respectively, which AAE is further described below.

Figure 4B:
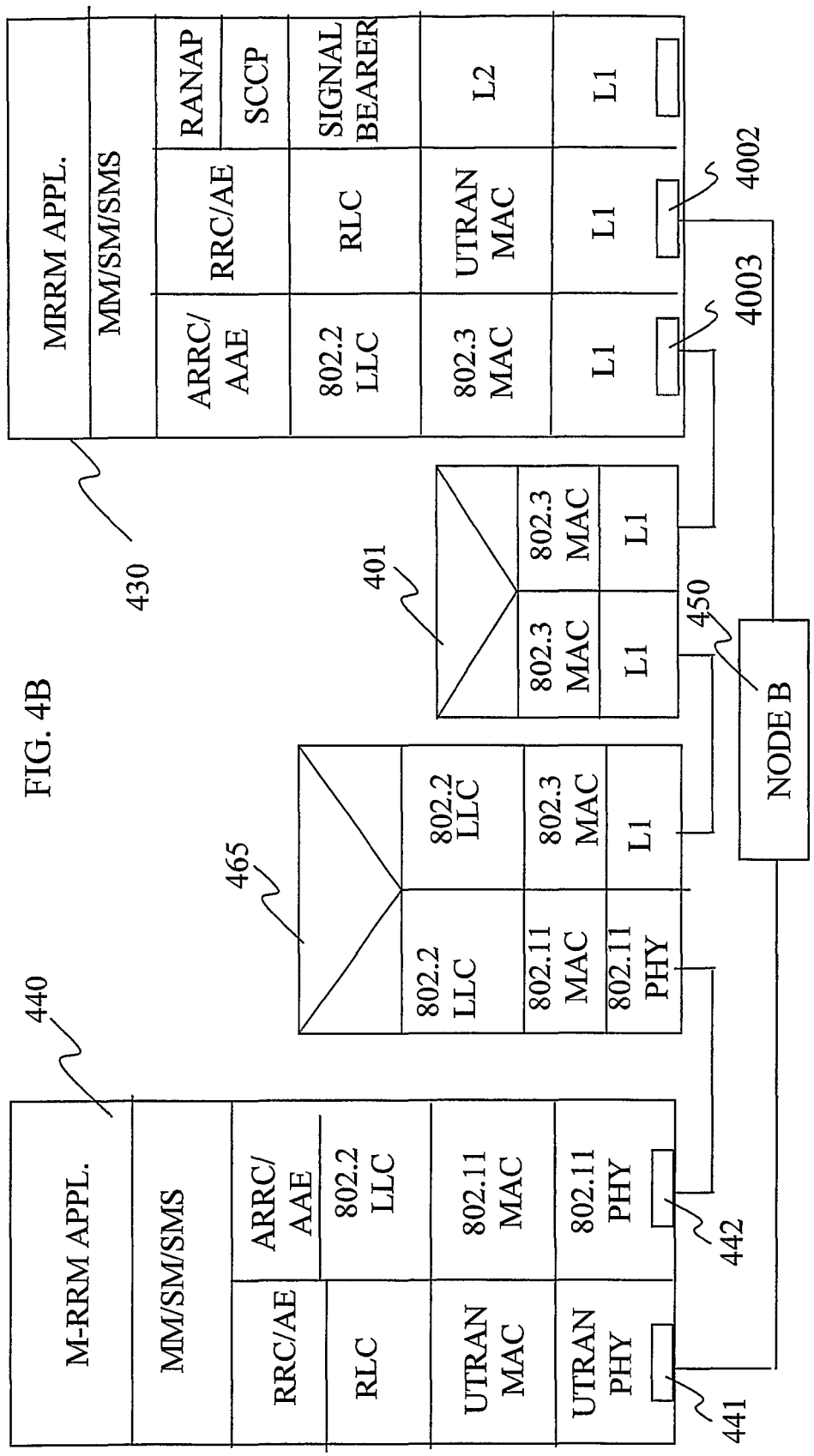
FIG. 4B illustrates an example of the protocol stacks and software applications of the network illustrated in FIG. 2, for signalling radio resource control (RRC) messages over the WLAN or WLAN-IP-Network routing path, illustrated in FIGS. 2 and 5.

FIG. 4B illustrates the protocol stacks for signalling RRC (Radio Resource Control) messages between the UT 440 and RNC 430. According to the invention, an RRC message may be e.g. a Conventional (UTRAN or WLAN) RRC message, MM (Mobility Management) message, SM (Session Management) Message, CC (Call Control) message. A UTRAN RRC message may be signalled from/to the UT 440 to/from the RNC 430 by means of the conventional UTRAN RRC protocol. A conventional UTRAN RRC message is normally subject to a conventional authentication entity, AE, forming a digest (MAC-I) from the message which is attached to the message before transmitting it to/from the UT 440, from/to RNC 430. A corresponding digest (XMAC-I) is formed at the receiver by a corresponding AE, and the message is considered authentic if XMAC-I equals with XAC, as described below with reference to FIG. 7C. The UTRAN AE normally resides at the UTRAN RRC layer, as illustrated in FIG. 4B. The invention provides an alternative radio resource control protocol, ARRC, on top of the 802.2 LLC layer, allowing the UT 440 and RNC 430 to signal RRC and MRRM messages to each other over the WLAN routing path. According to the invention, the ARRC defines a set of ARRC messages, which may comprise e.g. conventional WLAN RRC messages, e.g. WLAN MM-, SM-, and SMS messages, e.g. signalled to the UT 440 from AP 465 by means of the conventional STAME and APME applications illustrated in FIG. 4A or from AP 465 to the RNC 430 by means of the conventional IAPP protocol illustrated in FIG. 4A. The ARRC messages may comprise various radio link parameters e.g. measured by AP 465, such as signal to interference and noise ratios, SINR, bit error rate, BER, QoS, for specific UT's and conventional parameters regarding traffic load of AP 465, and also modified UTRAN RRC messages, as a person skilled in the art realises. Also, e.g. MRRM messages may be signalled between the UT 440 and RNC 430 by means of the ARRC, as a person skilled in the art realises. The ARRC messages normally comprise identifiers identifying a specific AP and/or UT, as a person skilled in the art realises, and are signalled between the UT 440 and RNC 430 by means of conventional data layer processing exploiting the IEEE LLC 802 layer. The ARRC messages are normally stored in a memory at RNC 430 and UT 440 wherein the MRRM application of UT 440 and RNC 430 have access to the ARRC messages in said memory. The invention provides an alternative authentication entity, AAE, at the ARRC layer, allowing the UT 440 and RNC 430 to establish the authentication of RRC messages signalled over the WLAN path, as described further below.

FIG. 5 illustrates an alternative embodiment of a UTRAN-WLAN-integrated network according to the present invention. In this embodiment, a WLAN, comprising the AP 565 and the ML-2S 501, is connected to an IP-network 5050, via an Access Router 5010. Optionally, the IP-Network 5050 may be connected to the RNC 530 through an access router, not illustrated in FIG. 5. The Access Router 5010 is connected to a DHCP (Dynamic Host Configuration Protocol) server 5015, which may be integrated with the RNC 530. In FIG. 5, the RNC 530 is connected with the base station node B 550 via port 5002, forming a UTRAN routing path. The M-L2S 501 is connected to the Access Point, AP, 265, however, many possibilities exist. A plurality of AP:s may e.g. be connected directly to the Access router 5010 or to a plurality of intermediate M-L2S:s connected to the Access router 5010. There may be several M-L2S:s in the routing path between an AP and an M-L2S. Normally, in order to facilitate distributing or multicasting layer 2 messages within the WLAN, the Access router 5010 is connected to the WLAN through one single M-L2S. The RNC 530 is normally connected to further RNC:s in a conventional manner, not shown in FIG. 5, which in turn may be connected to their respective WLAN:s, e.g. via M-L2S:s or IP-networks via Access routers. The RNC 530 is connected to the SGSN 520. The SGSN 520 is connected to the GGSN 510 which in turn is connected to the Internet 570. According to the invention, the RNC 530 is further connected with the IP-network 5050 through the RNC data port 2003. The AP 565 is connected with the M-L2S 501. The dual mode/capability UT 540 can establish a WLAN radio connection with the layer 2 WLAN network through its WMAC (Wireless Media Access Control) port 542. A data communication session between the UT 540 and a second party, e.g. a peer or a host on the Internet 570, can e.g. be carried out by means of a PDP context session between the UT 540 and the GGSN 510, in the same manner as described above with reference to FIG. 2.

Figure 6:
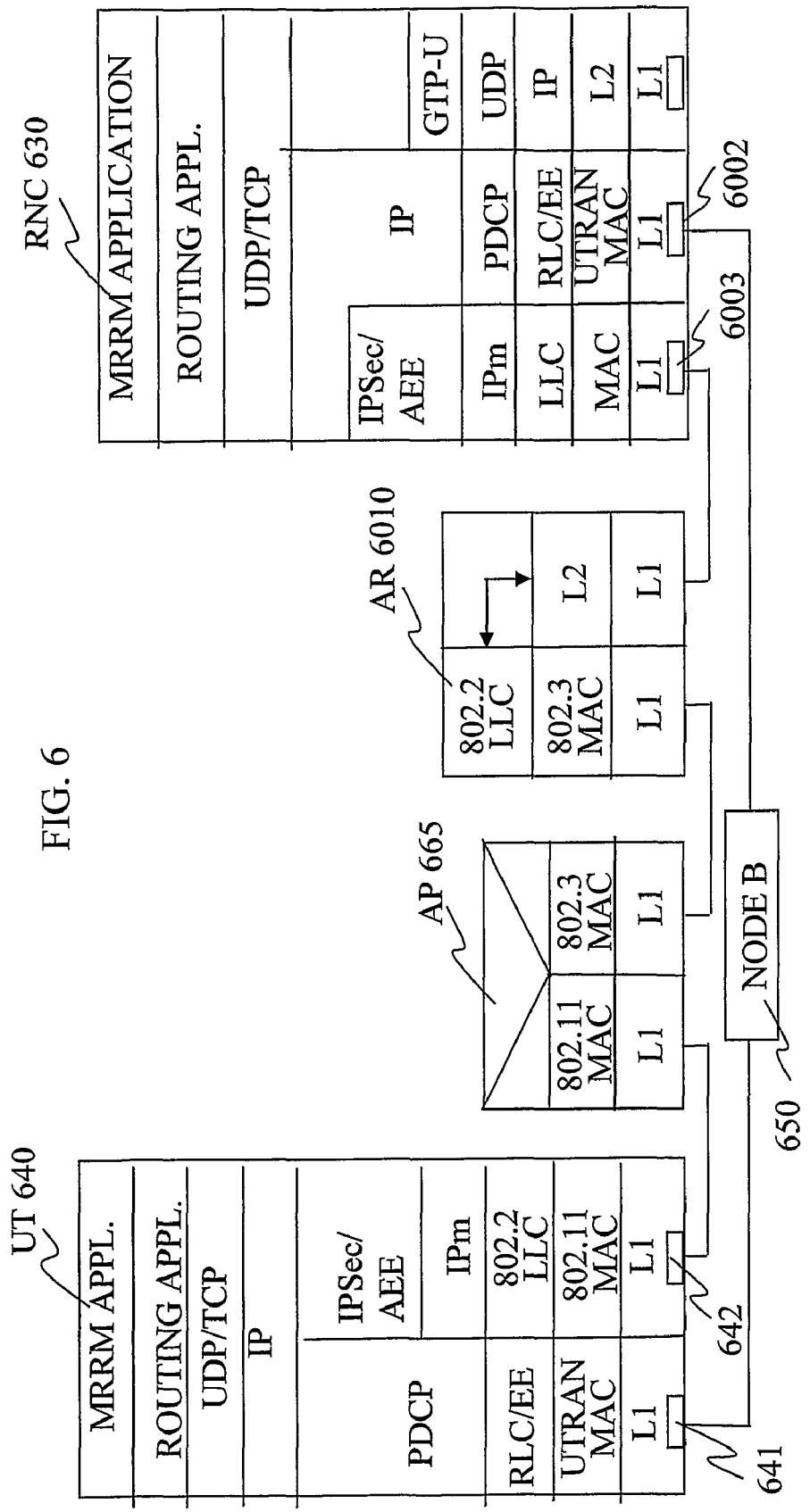

FIG. 6 illustrates an example of the protocol stacks and applications which are used by the RNC 530, the Access router 5010, the AP 565 and the UT 540 in FIG. 5. The M-L2S 501 in FIG. 5 normally acts as an AP, the IP-Network 5050 relays IP-packets to/from Access Router 5010 from/to RNC 530, these are therefore left out in FIG. 6. As illustrated in FIG. 6, the RNC 630 has conventional UTRAN protocol stack installed, comprising UTRAN MAC protocol, associated with port 6002, RLC protocol, PDCP/RRC protocols, GTP-U protocol, IP and UDP/TCP. According to the invention, the RNC 630 further has a MRRM application and a Routing application installed. According to the invention, the RNC 630 further has a conventional layer one (physical) and MAC layer installed associated with data port 6003, enabling the RNC 630 to communicate with the Access Router 6010. The UT 640 has a conventional UTRAN protocol, comprising a UTRAN physical layer, a MAC layer, RLC layer, and a PDCP/RRC protocol layer. The UT 340 has also an Ethernet- and WLAN-protocol stack installed, i.e. an IEEE 802.11 physical layer, MAC layer and 802.2 LLC layer, a IPm protocol (mobile IP) and an IPSec protocol, as illustrated in FIG. 6. The IPm and IPSec protocols may also be integrated. According to the invention, the UT 640 has further an IP-layer, a UDP/TCP layer, and a Routing application and a MRRM application installed "on top" of the UDP/TCP layer, as illustrated in FIG. 6. In a similar manner, the RNC 630 has an IPm and an IPSec protocol, and a MRRM application and a Routing application are installed "on top" of a UDP/TCP layer, as illustrated in FIG. 6. The MRRM and Routing application of the UT 640 and of the RNC 630 can communicate with each other by conventional layer data processing. The UT 640 and RNC 630 have a conventional 3GPP Authentication application Entity, AE, installed at the RRC layer and conventional 3GPP Encryption application Entity, EE, installed at the RLC layer. According to the invention, the UT 640 and RNC 630 have an Alternative Encryption application Entity, AEE, corresponding to the AEE described above with reference to FIG. 4A, but in this embodiment the AEE is installed at the IPSec layer. The UT 640 and RNC 630 have an ARRC and an AAE, corresponding the ARRC and AAE of FIG. 4, installed on top of the IEEE 802.2 LLC layer, not illustrated in FIG. 6. The AE, EE, AAE and AEE are further described below.

Figure 7A:
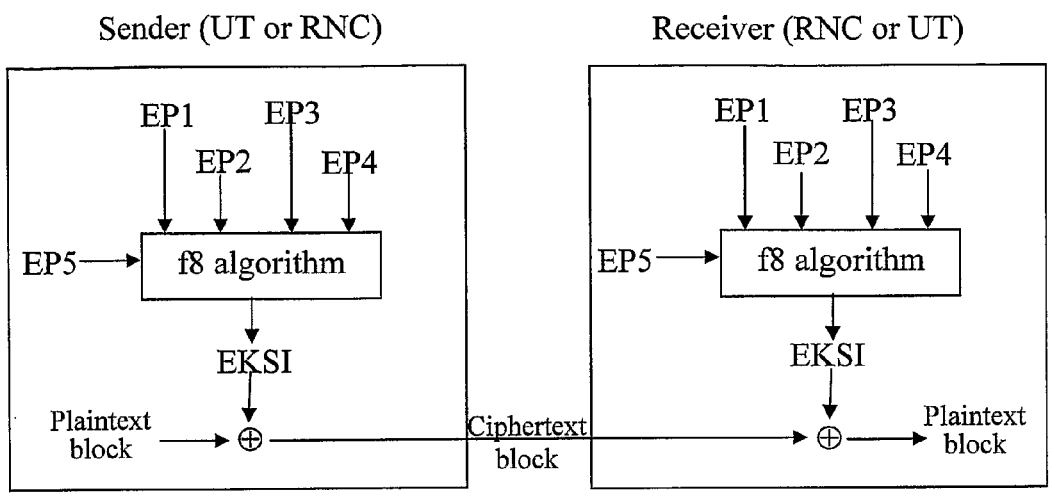
FIG. 7A illustrates conventional 3GPP data encryption exploiting the 3GPP f8 algorithm and a conventional set of 3GPP encryption parameters.

FIG. 7A illustrates how the conventional EE ciphers (encrypts) data by exploiting the conventional 3GPP f8 algorithm. The EE is normally running, at UT's (240), and RNC's (230), RLC sub-layer, or, alternatively at the MAC sub-layer. As illustrated in FIG. 7A, the f8-algorithm uses 5 conventional encryption parameters, EP1-EP5, to form a key bit stream block, EKS1, which is applied on the data to be encrypted, referred to as plaintext block in FIG. 7A, by means of bitwise modulo 2 addition. In this way, the RNC (230) and UT (240) exploit the identical encryption parameters (and parameter values) and the identical f8 algorithm, in an efficient way. The 5 conventional 3GGP encryption parameters, EP1-5, are:

EP1: a 32 bit ciphering sequence number, referred to as "COUNT-C" in 3GPP: Normally, there is one COUNT-C value in the uplink and one COUNT-C value in the downlink. As an example, for RLC AM (Acknowledged Mode) the COUNT-C value is a data frame number, NR1, composed of the 12-bit RLC frame sequence number, RLC SN, here referred to as FSN1, and the 20-bit RLC hyperframe number, RLC HFN, here referred to as HYPFSN1, which is incremented at each RLC SN cycle. The RLC SN forms the least significant bits of the COUNT-C parameter value and the RLC BFN forms the most significant bits of the COUNT-C parameter value.

EP2: a 5 bit radio bearer identifier, referred to as "BEARER" in 3GPP. The BEARER parameter (i.e., the 3GPP RB ID value) ensures that different set of input parameter values is used to generate different key-streams for different plaintext data, i.e. for different sessions/users. One BEARER parameter value exists for each radio bearer associated with a specific user/session.

EP3: a 1 bit direction identifier, referred to as "DIRECTION" in 3GPP. In order to differentiate the key-streams used for the uplink and downlink transmission, the DIRECTION value is set to "0" for uplink transmission and to "1" for downlink transmission.

EP4: a 16-bit key-stream length indicator, referred to as "LENGTH" in 3GPP. This parameter determines the length of the key-stream block and thus indicates the number of data bits which are encrypted/decrypted in each "encryption cycle".

EP5: a 128 bit cipher key, referred to as "CK" in 3GPP: At the network side the CK is sent from the HSS (Home Subscriber Server) to the SGSN during the conventional 3GPP AKA (Authentication and Key Agreement) procedure, which is a challenge-response method, at communication connection set up, which SGSN then sends it in the RANAP message "Security Mode Command" to the serving RNC. At UT 240, the CK is established during the AKA procedure by means of various signalling at communication connection set-up, in a known manner.

Thus, there are 5 identical EP parameters for each communication session at UT 240 and RNC 230, forming input parameter values to the same f8 encryption algorithm running at the UT 240 and RNC 230, as illustrated in FIG. 7A.

After the RRC connection is established and the security mode setup procedure is executed, the integrity of almost all conventional dedicated signalling messages between UT 240 and RNC 230, e.g., RRC—(Radio Resource Control), MM—(Mobility Management), CC—(Call Control), and SM (Session Management) messages, is protected by means of the AE at UT 240 and RNC 230. The MM layer of UT supervises the start of AE, that applies at the RRC layer, in a conventional manner.

Figure 7B:
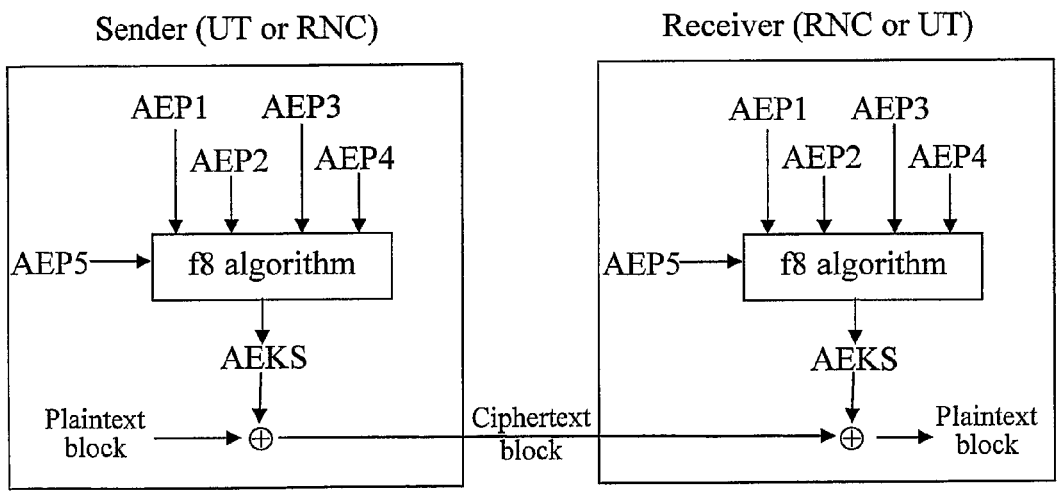
FIG. 7B illustrates the encryption of data according to the invention, when data are transmitted over an alternative transmission path, e.g. over a WLAN, by exploiting the 3GPP f8 algorithm and an alternative set of encryption parameters.
Figure 7C:
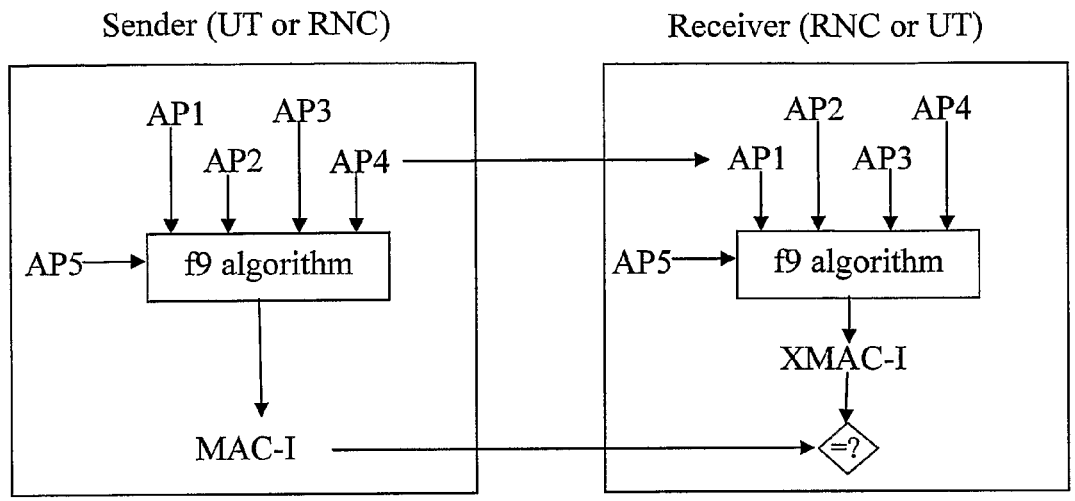
FIG. 7C illustrates conventional 3GPP message integrity protection exploiting the 3GPP f9 algorithm and a conventional set of 3GPP authentication ciphering parameters.

FIG. 7C illustrates the conventional integrity algorithm f9 used by the AE at UT 240 and RNC 230 to produce MAC-I (a digest computed from the message to be sent) by the transmitter and to compute AC-I (a digest computed from the received message) at the receiving side. The integrity of the received signalling message is considered to be verified if the computed XMAC-I digest and the received MAC-I digest are identical. The f9 integrity function is based on the KASUMI block cipher as also used for the f8 confidentiality function. KASUMI is used in Cipher Block Chaining (CBC) mode to generate a 64-bit digest of a message input. The leftmost 32 bits of the digest are taken as the output value MAC-I. At the sender and receiver side the 3GPP f9 function uses the same input authentication ciphering parameters, AP1-5, as follows:

AP1: a 32-bit integrity sequence number ("COUNT-I"). There is one COUNT-I value each per uplink and downlink signalling radio bearer (RB 0-4). COUNT-I is composed of the 4-bit RRC sequence number (RRC SN) provided in each RRC PDU, and the 28-bit RRC hyperframe number (RRC HFN) which is incremented at each RRC SN cycle.

AP2: a 32-bit random value ("FRESH"). There is one network-side nonce (Randomly generated number) FRESH value per user used to protect the network against replay attack. This random value is generated by the RNC during connection set-up and is sent to the UT 240 in a RRC security mode command. Both RNC 230 and UT 240 use the value FRESH throughout the duration of a single connection.

AP3: a 1-bit direction identifier ("DIRECTION"). In order to differentiate the MAC-I digest used for the uplink and downlink signalling messages, the DIRECTION value is set to "0" for messages from UT 240 to RNC 230 (uplink), and to "1" for downlink messages.

AP4: a message to be protected ("MESSAGE"). The 3GPP radio bearer identifier, i.e. the 3GPP RB ID of the RRC signalling connection in question, is normally attached to the actual signalling message, in a conventional manner. Note that the RB ID is only needed to avoid the use of the same input parameters for different MAC-I digests but it is not transmitted with the message. A maximum length of f9 input message of 5000 bits is arbitrarily restricted by the specifications.

AP5: a 128-bit integrity key ("IK"). At UT 240 the IK is established during the AKA procedure. At network side the IK is sent (together with CK) from the HSS to the SGSN, which then forwards it in the RANAP message "Security Mode Command" to the serving RNC 230.

Thus, there are 5 identical AP parameters for each communication session at UT 240 and RNC 230, forming input parameter values to the same f9 authentication algorithm running at the UT 240 and RNC 230, as illustrated in FIG. 7C.

With reference to FIG. 8, the method according to the invention shall now be described. In step 810, a conventional data session is set up over the first transmission path, i.e. over the UTRAN path, between the UT 240 and a host or peer at the Internet 270, e.g. by establishing a PDP context data session between the UT 240 and RNC 230 as described above, in a conventional manner. Furthermore, in step 810, a conventional 3GPP AKA (Authentication and Key Agreement) procedure is carried out during the data session set up. The conventional 3GPP encryption parameters EP1-5 and 3GPP authentication ciphering parameters AP1-5, described above, are present and used in a conventional manner by the f8-algorithm and f9-algorithm, respectively, at the UT and RNC, after the AKA procedure. Thus, user data transmitted over the UTRAN path are encrypted and 3GPP signalling messages transmitted over the UTRAN path are authentication ciphered, as described above with reference to FIGS. 7A and 7C.

In step 820, the EE of UT 240 and RNC 230 encrypt the data of said session in a conventional manner by feeding the conventional f8 ciphering algorithm with the 3GPP encryption parameters EP1-EP5, described above with reference to FIG. 7A. Furthermore, the AE of UT 240 and RNC 230 integrity protects e.g. RRC-, (MM-, CC- and SM) messages by means of the 3GPP f9 algorithm forming/comparing message digests at the receiving/transmitting side for said messages.

In step 830, a set of alternative ciphering parameters are defined, according to the invention. More specifically, in one embodiment 5 alternative encryption parameters, AEP1-AEP5, are according to the invention defined so as to comply with the 3GPP f8 algorithm described above, i.e. having sense to the 3GPP f8 algorithm. In one embodiment, 5 alternative authentication ciphering parameters, AAP1-AAP5, are defined so as to comply with the 3GPP f9-algorithm.

The 5 alternative encryption parameters, AEP1-5, shall now be described further.

AEP1: According to the invention, the AEP1 is defined in order to substitute the conventional 3GPP EP1 parameter, i.e. it has sense to the f8 algorithm when substituting EP1. In one embodiment associated with the network architecture of FIG. 2, the AEP1 is a ciphering sequence number complying with the EP1 and defined in the following way:

1. defining a WLAN frame number scheme for defining an alternative number, ANR, for each of the 802 LLC data frames,
2. defining said AEP1 as a 32 bit ciphering sequence number being a function of said ANR.

In one embodiment associated with the network architecture of FIG. 2, the ANR is defined in the following way:

ANR value=AHYPFSN value+AFSN value, wherein AFSN is the conventional 7 bit transmitter send frame sequence number according to the IEEE 802 LLC frame format standard, conventionally referred to as N(S), and AHYPFSN is a 25 bit hyper-frame sequence number, defined according to the invention by defining one hyper-frame as a set of $2^7$ consecutive conventional LLC frames. The value of AHYPFSN is incremented after each N(S) cycle is completed, i.e. after each cycle of $2^7$ LLC frames. The synchronisation can be done implicitly during packet transmission, e.g. by incrementing the AHYPFSN value each time a receiver, i.e., UT (240) or RNC, recognises that the N(S) value in the LLC header is zero, i.e. each time an entire N(S) LLC frame cycle is completed. Thus, ANR is a 32 bit parameter fully complying with the bit length of the conventional 3GPP "COUNT-C" parameter. In one embodiment associated with the network architecture depicted in FIG. 2, the AEP1 equals said ANR.

In an alternative embodiment associated with the network architecture depicted in FIG. 5, the AEP1 is defined to be a function of the conventional 32 bit "Sequence Number" in the ESP header (IP Encapsulating Security Payload), which is defined by the IPSec standard protocol. This sequence number is here referred to as "ESP-SN". The ESP-SN is increased for each packet and is always present in the IP-packet's ESP header during a secure IP connection between UT 540 and RNC 530, according to the IPSec protocol, and is thus always available to the UT 540 and RNC 530 during an IPSec session. AEP1 may e.g. be defined to equal said ESP-SN. Alternatively, ABP1 may be defined as a hash function of EP1, e.g. by performing a 1 bit XOR operation between consecutive bit values of EP1, but many other possibilities exist. In this way the AEP1 complies fully with the bit length of the conventional 3GPP "COUNT-C" parameter.

AEP2: in one embodiment associated with the network architecture of FIG. 2, AEP2 is defined as being a function of the alternative routing identifier WLAN RB ID 1 created during the handoff of the data session from the UTRAN path to the WLAN path in FIG. 2 as described below, e.g. with reference to step 840. For instance, AEP2 may be set to equal the 5 least significant bits of WLAN RB ID 1, but many other possibilities exist.

In an alternative embodiment associated with the network architecture of FIG. 5, AEP2 is defined as being a function of the alternative routing identifier WIP RB ID 1 created during the handoff of the data session from the UTRAN path to the WLAN-IP-Network path in FIG. 5 as described below, e.g. with reference to step 840. For instance, AEP2 may be set to equal the 5 least significant bits of WIP RB ID 1, but many other possibilities exist.

In still another embodiment associated with the network architecture of FIG. 5, AEP2 is defined as being a 5 bit function value of a conventional 32 bit SPI (Secure Parameter Index) standard parameter defined by the IPSec (IP Security) standard protocol. The SPI parameter value is present in all IP packets during a secure IPSec connection between UT 540 and RNC 530. The AEP2 may alternatively be defined as being a 5 bit function value of the IP-address as such, e.g. being a hash function of an IP6 address (128 bits) or IP4 address (32 bits). Still another possibility is to define the AEP2 as a 5 bit hash value of SPI. The AEP 2 may for instance be defined to equal the 5 least significant bits of the SPI value, in order to comply with the bit length of EP2, but many other obvious possibilities exist.

In this way the AEP2 complies fully with the bit length of the conventional 3GPP "BEARER" parameter.

According to the invention, AEP3 is defined in the same manner as the conventional 3GPP EP3, i.e. is a one bit parameter set to "0" for uplink transmission and "1" for downlink transmission. However, other obvious possibilities exist.

According to the invention, AEP4 is defined in the same manner as the conventional 3GPP EP4, i.e. AEP4 is set to equal EP4 for the specific session, when the session is switched over to the alternative network transmission path, i.e. from the UTRAN path to the WLAN or WLAN-IP-Network path as described below in step 840. However, other obvious possibilities exist.

According to the invention, AEP5 is defined in the same manner as the conventional 3GPP EP5, i.e. AEP5 is set to equal EP5 for the specific session, when the session is switched over to the alternative network transmission path, i.e. from the UTRAN path to the WLAN or WLAN-IP-Network path as described below in step 840. However, other obvious possibilities exist.

Other possibilities exist for how to define the AEP1-5, e.g. using synchronised clocks and/or application specific indexes existing transparently in the encrypted packet frames etc, i.e. the parameters are not encrypted, as a person skilled in the art realises. What is important according to the invention is that AEP1-5 have sense to the common encryption algorithm, i.e. are compatible with the f8-algorithm in this embodiment. Preferably, EP1-5 are defined synchronously so that they have the identical value at the UT (240) and the RNC (230).

AEP1-5 are thus defined so they are compatible both with said f8-algorithm and the alternative transmission protocol, i.e. they have the same bit length as the corresponding EP1-5, i.e. AEP1-5 have the same bit length as the corresponding EP1-5, and may be defined as being function/s of parameter/s defined by the alternative transmission protocol, i.e. the WLAN transmission protocol standard and/or being function/s of the EP1-5.

The 5 alternative authentication ciphering parameters, AAP1-5, are according to the invention defined as follows:

AAP1: the ARRC messages are each associated with a specific alternative message sequence number, AMSNR, which is defined according to the invention as a 32-bit sequence number. The AMSNR may e.g. be defined as a 32 bit sequence of "0"-bits for the first RRC message and incremented (with 1) for each consecutive ARRC message, and restart with 32 "0"-bits after a fall 32 bit cycle, but many other possibilities exist.

AAP2: In one embodiment, AAP2 is defined as being equal with a second 3GPP authentication parameter AP2 referred to as a FRESH parameter according to 3GPP, but many other possibilities exist.

AAP3: In one embodiment, AAP3 is defined as being equal with a third 3GPP authentication parameter AP3 referred to as a DIRECTION parameter according to 3GPP, but many other possibilities exist.

AAP4: In one embodiment, AAP4 is defined as being a signalling message according to the alternative routing path transmission protocol, e.g. a WLAN standard signalling message defined by the WLAN standard protocol or an IPSec standard signalling message defined by the IPSec standard protocol. AAP4 is compatible with the 3GPP f9 algorithm by applying the same restrictions, e.g. regarding bit length, for the AAP4 as for the conventional 3GPP AP4 "MESSAGE" described above.

AAP5: In one embodiment, AAP5 is defined as being equal with a fifth 3GPP authentication parameter AP5 referred to as an integrity key (IK) parameter according to 3GPP, but many other possibilities exist.

In step 840, the routing of the data session is switched from the first transmission path, i.e. UTRAN path, to the alternative transmission path, i.e. WLAN or WLAN-IP-Network transmission path in FIGS. 2 and 5, respectively. The switching, or handover, is described below with reference to FIG. 9 in case of a handover process associated with the network illustrated in FIG. 2-4. The switching, or handover, is described below with reference to FIG. 10 in case of a handover process associated with the network illustrated in FIG. 5-6.

In step 850, user data and/or RRC messages transmitted over the alternative routing path, i.e. WLAN or WLAN-IP-Network, are ciphered by means of the AEE and/or AAE described above. User data of the data session is encrypted by the AEE by feeding the conventional 3GPP f8 ciphering algorithm with the alternative encryption parameters AEP1-AEP5, described above. Thus, according to the invention, the very same f8 algorithm described with reference to FIG. 7A is now exploited by the AEE at UT's (240), and RNC's (230), LLC sub-layer, or, alternatively at the WLAN MAC sub-layer, according to an embodiment associated with FIG. 2. or, alternatively, at the IPSec-layer, according to an embodiment associated with FIG. 5. This is illustrated in FIG. 7B. In FIG. 7B, at the LLC-sub-layer, or IPSec layer, the f8-algorithm is fed by the 5 alternative encryption parameters, AEP1-AEP5, to form an alternative key-stream block, AEKS, which is applied on the data to be encrypted, referred to as plaintext block in FIG. 7B, by means of bitwise modulo 2 addition. In this way, the RNC (230) and UT (240) can exploit the identical encryption algorithm for the first radio access network path, i.e. the UTRAN path in FIG. 2, and the alternative access network path, i.e. the WLAN path in FIG. 2 or WLAN-IP-Network in FIG. 5.

Thus, the same cipher key (CK) that has been exchanged during UMTS AKA procedure between UT 240 and RNC 230 (transferred from SGSN) may be reused in combination with the same confidentiality algorithm f8, which is implemented within an AEE at RNC and UT. Instead of 3GPP RLC payload, now the IEEE 802 LLC payload, or IPSec payload, i.e., the IP packet, referred to as plaintext block in FIG. 7B, is encrypted by means of bitwise modulo 2 addition, i.e. it is XOR-ed with the generated alternative bit key-stream/s, AEKS, illustrated in FIG. 7B.

Figure 7D:
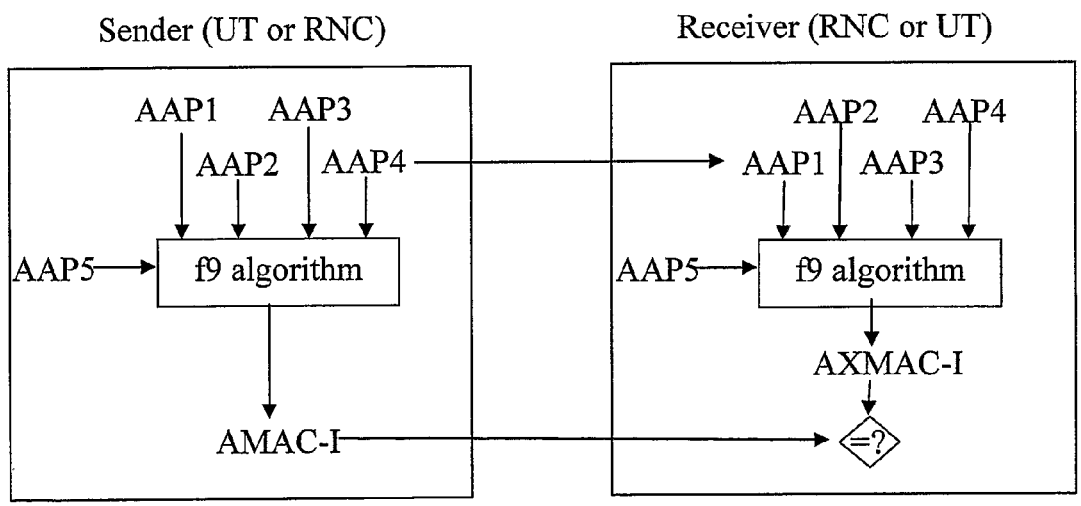
FIG. 7D illustrates the message integrity protection according to the invention, when messages are transmitted over an alternative transmission path, e.g. over a WLAN, by exploiting the 3GPP f9 algorithm and an alternative set of authentication ciphering parameters.

Furthermore, alternative digests, AMAC-I:s, are formed at the UT 240 and RNC 230, respectively, by feeding the 3GPP f9 algorithm with the alternative set of authentication ciphering parameters, AAP1-5, as illustrated in FIG. 7D. The AMAC-I:s are transmitted along with the ARRC messages exploiting the ARRC protocol, as described in FIG. 4B. At the receiving side, alternative digests, AXMAC-I:s, are formed at the UT 240 and RNC 230, respectively, by feeding the 3GPP f9 algorithm with the alternative set of authentication ciphering parameters, AAP1-5, as illustrated in FIG. 7D, and a ARRC message is authentication checked in a conventional manner by comparing the transmitted AMAC-I with the calculated AXMAC-I, as illustrated in FIG. 7D.

In this way, the entire alternative routing path, e.g. the WLAN-path between UT 240 and RNC 230 in FIG. 2 is encryption protected and/or integrity protected (by means of authentication ciphering), in an efficient manner, according to the invention. This is illustrated in by the bold lines in FIGS. 2 and 5.

The invention provides an efficient reuse of ciphering algorithms (3GPP f8 and f9), encryption keys, (key streams), and ciphering parameters (AEP1-5 and/or AAP1-5), since the ciphering takes place in the same network nodes, i.e. RNC 230, 530 and UT 240, 540, for the UTRAN path ciphering and WLAN path/IP-network path ciphering.

Even though the invention here is described for the case in which the UTRAN ciphering parameters are reused after handover to the alternative, WLAN, routing path, the invention is not restricted hereto. Any alternative ciphering parameters compatible with the f8/f9 algorithm may be used, as long as the alternative ciphering parameters have the same bit length as the 3GPP ciphering parameters, i.e. are compatible with the f8/f9 algorithm.

Figure 9:
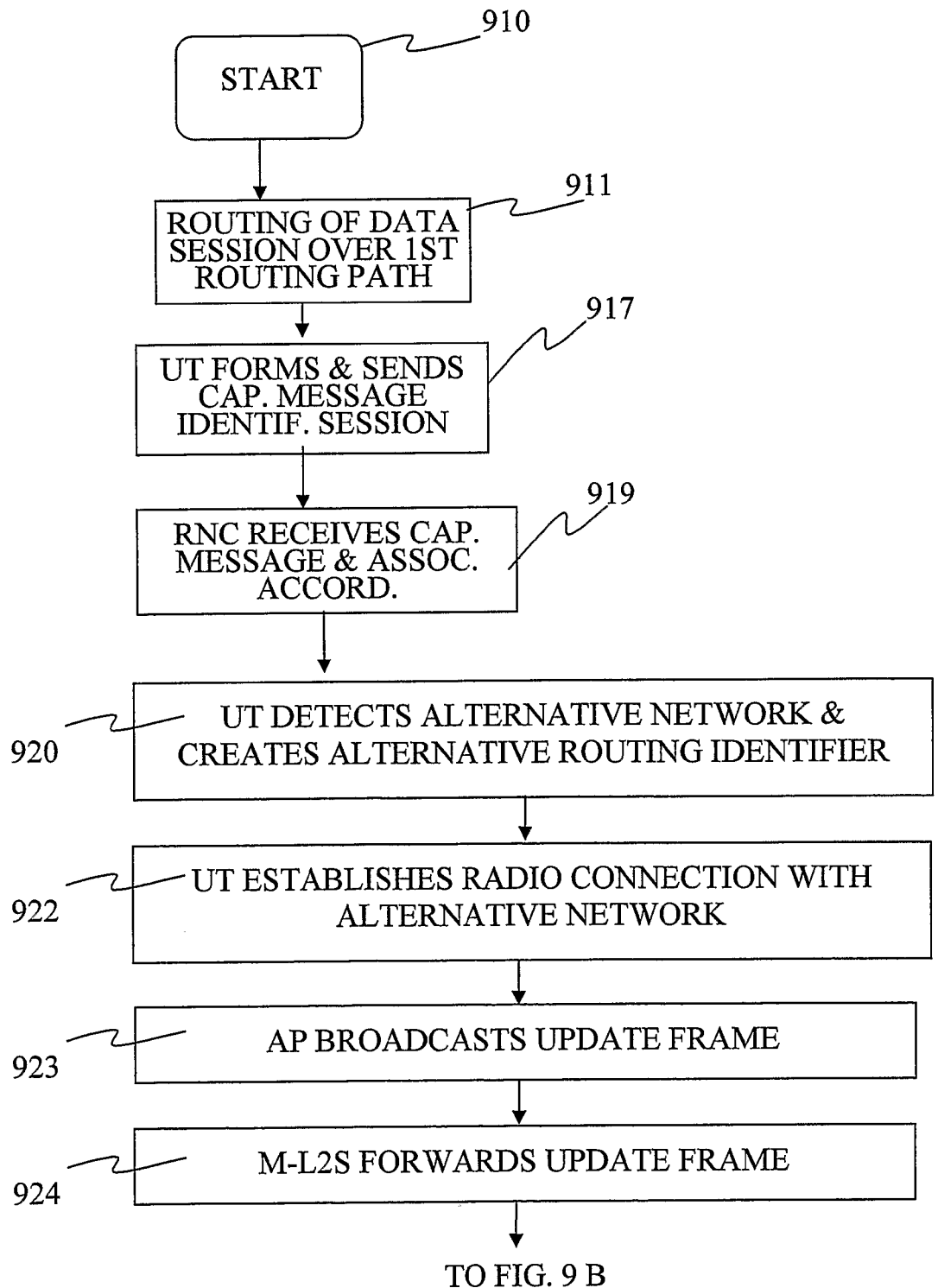
FIG. 9A-C show a flow chart illustrating a handover procedure according to one embodiment of the invention.
Figure 9B:
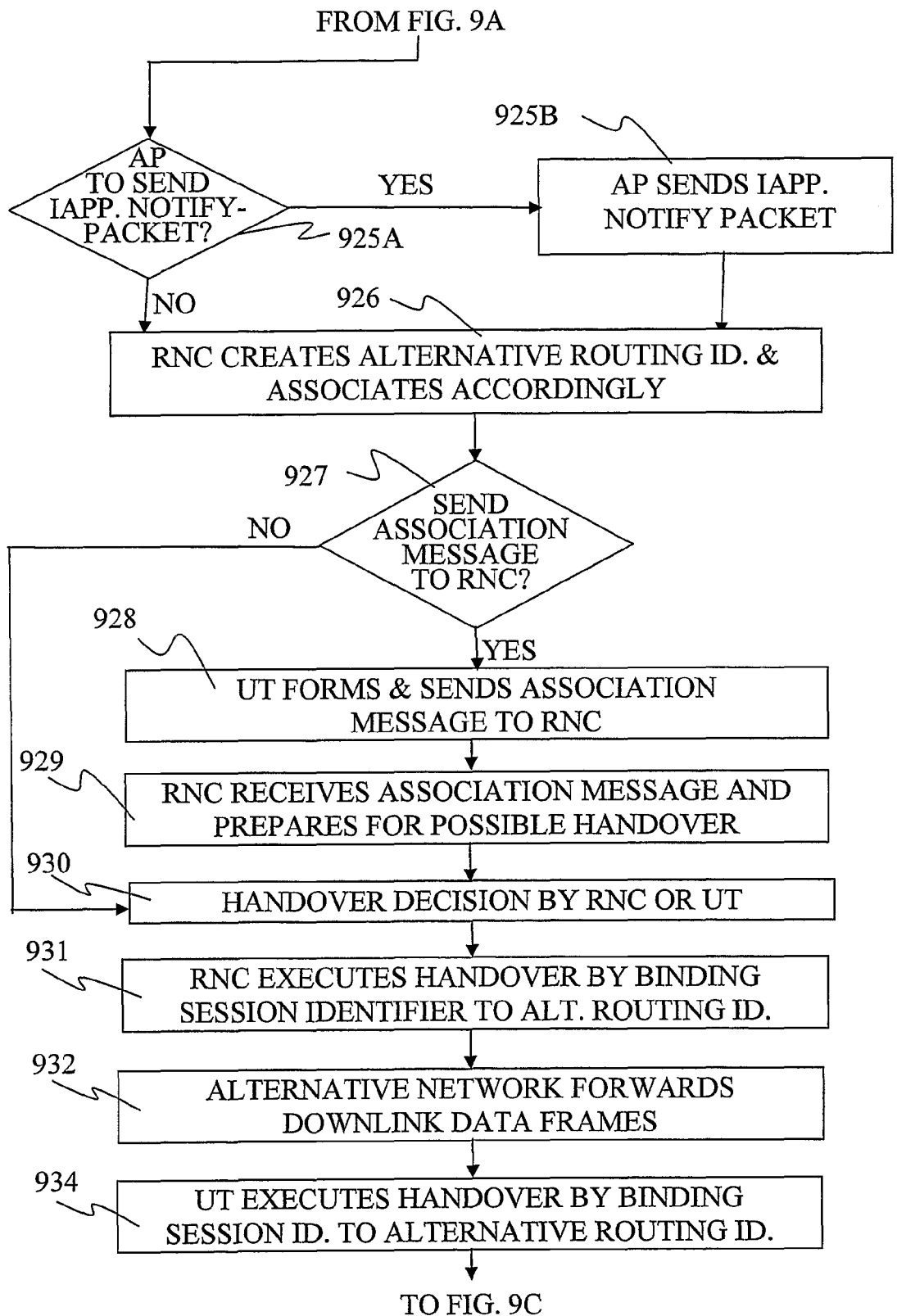

FIGS. 9A-C illustrate the method for performing a handover of a PDP context data session from the UTRAN radio network routing path (associated with ports 241 and 2002) to the alternative WLAN radio network routing path (associated with ports 242 and 2003) in FIG. 2, according to one embodiment of the present invention associated with the network architecture depicted in FIGS. 2, 3 and 4. The handover method according to this embodiment of the invention shall now be described in more detail with reference to FIGS. 2, 3, 4 and 9.

Referring to FIG. 9A-C, in step

In step 911, data of said PDP context session are routed over the first routing path, i.e. the UTRAN routing path, in a conventional manner by letting the Routing application of UT 240 bind a session identifier uniquely identifying said PDP context session, e.g. the 3GPP RAB ID, to a first routing identifier, e.g. the 3GPP RB ID and the Routing application of RNC 230 binds a first session identifier uniquely identifying said PDP context session, e.g. the TEID of the relevant GTP-U tunnel, to a first routing identifier, e.g. the 3GPP RB ID associated with said UT 240. Thus, the session identifiers and first routing identifiers are defined according a standard protocol routing scheme of the first access network, i.e. a cellular radio network, i.e. the 3GPP UTRAN in this case.

In step 917, the MRRM application of UT 240 forms and sends a capability message to the MRRM of RNC 230. According to the invention, this capability message uniquely identifies said UT 240 according to a standard protocol routing scheme of said first access network, e.g. the cellular radio network in form of the UTRAN, and also uniquely identifies said UT 240 according to a standard protocol routing scheme of said alternative access network, e.g. the protocol routing scheme of the WLAN. This message is thus formed, and sent, in such a way by the MRRM of UT 240 that the MRRM application of RNC 230 can extract information uniquely identifying the UT 240 according to both of said standard protocol schemes, and set up a radio bearer identity defining a data session connection with said UT 240 for both of said networks, at a later stage. The capability message may for instance be sent over the UTRAN path via an already established connection, e.g. over the DCCH, thereby uniquely identifying the UT 240 to the RNC according to the UTRAN routing scheme protocol standard, and comprise the alternative network address, NA, i.e. the WLAN MAC address of the UT 240 in this case, associated with the UT's 240 alternative WLAN routing path and data port 242. The RNC is thus informed that the UT 240 has WLAN-capability and can establish a radio communication connection with the AP 265, and the RNC 230 may also define a data communication session with UT 240 through the WLAN by setting up a WLAN radio bearer identity with specific QoS requirements and associate the WLAN radio bearer identity with the WLAN MAC address of UT 240. Thus, the NA is defined according to a standard protocol routing scheme of said WLAN network, differing from the routing scheme of the cellular radio network, i.e. the 3GPP routing scheme. Many possibilities exist, This message can e.g. be a modified RRC (Radio Resource Control) message sent from UT 240 to RNC 230 on the up-link DCCH, over the UTRAN communication path, but may be sent over the WLAN to the RNC 230 and comprise e.g. the UT's 240 3GPP IMSI (International Mobile Subscriber Identity), or the IP-address of the PDP context session, in case there is only an established connection over the WLAN communication path, as a person skilled in the art realises. In one embodiment, the capability message further comprises a session identifier uniquely identifying the data session, e.g. the 3GPP RB ID or the 3GPP RAB ID of Table 2, uniquely identifying the specific PDP data context session. In this way, the UT 240 can control which PDP context session/s, among a set of ongoing PDP context session/s, for which a handover may be desirable. This may be accomplished by letting the UT 240 send said capability message over the UTRAN path e.g. exploiting said 3GPP RB ID 1 and 3GPP RAB ID 1, so that the RNC 230 can extract said 3GPP RB ID and 3GPP RAB ID, which uniquely identify the specific PDP context session.

In step 919, the MRRM application of RNC 230 receives the capability message sent over the UTRAN path and identifies that said UT 240 has dual mode capability, i.e. is capable of communicating via both said first and alternative routing path. Normally, in case the first access network is a cellular radio network and said alternative access network is a WLAN, the MRRM application of RNC 230 carry out this by extracting the NA from the received capability message, i.e. the WLAN address of UT 240, and updates the relevant MRRM and Routing information accordingly, i.e. by associating said NA with the specific UT 240 in the Routing Table 1 of the Routing application, but other possibilities exist. The identity of UT 240 is known to RNC 230 since the capability message was sent over the UTRAN path. The RNC 230 may for instance use a 3GPP radio bearer identity exploited for the capability message transmission over the UTRAN path, e.g. a 3GPP RB ID, to identify the UT 240. In one embodiment, the RNC 230 only associates said NA with the specific PDP context session of UT 240, i.e. with the RNC's specific session identifier TEID 1.

In step 920, the Routing application of UT 240 detects the WLAN (broadcast) beacon signal from AP 265, which signal comprises the AP:s 265 MAC address, and the UT 240 reads this AP MAC address and associates it with its port 242, if the UT 240 does not know the RNC's 230 MAC address at this stage. Normally, the UT 230 knows the RNC's 230 MAC address at this stage, e.g. it has been signalled over the UTRAN path e.g. by means of a DCCH message, and associates port 242 with the RNC's 230 MAC address in step 920. The MRRM application of UT 240 further creates an alternative routing identifier for the relevant data session/s, in this case referred to as a WLAN Radio Bearer Identity, WLAN RB ID 1, and associates the relevant PDP context session with it, e.g. by updating its routing table as illustrated in Table 3. The UT 240 associates the relevant PDP context session with WLAN RB ID 1 and the WLAN RB ID 1 with data port 242. Alternatively, the alternative routing identifier may be created by the RNC 230 and signalled to the UT 240 over the UTRAN path.

TABLE 3

| PDP Session | 3 GPP RB ID | 3 GPP RAB ID | NSAPI | WLAN Radio Bearer ID | Application |
| --- | --- | --- | --- | --- | --- |
| Session 1 | RB ID 1 | RAB ID 1 | NSAPI 1 | WLAN RB ID 1 | Web browsing |
| Session 2 | RB ID 2 | RAB ID 2 | NSAPI 2 | | E-mail |
| Session N | RB ID N | RAB ID N | NSAPI N | | Multimedia download |

Thereafter, in step 922, the UT 240 sends an association request message, in accordance with the IEEE 802 standard, to the AP 265, in order to initiate the WLAN connection set-up. This message comprises the UT's 240 MAC address. The AP 265 updates its bridging table accordingly by associating its relevant port with the UT's 240 WLAN MAC address. In one embodiment, said association request message also comprises the PDP context session identifier, e.g. the RB ID or RAB ID or the IP-address of the PDP context session or the NSAPI, for the relevant PDP session. The AP 265 responds by sending an Association Response message, as an 802.11 message, to the UT 240. The UT 240 receives this Association Response message and has thus an established radio connection with the WLAN via said second port (242).

In step 923, the AP 265 continues according to the IEEE 802 standard by broadcasting a layer 2 update frame towards the WLAN Distribution System (DS), i.e. to the M-L2S 201 towards the RNC 230. In one embodiment, said update frame also comprises said PDP context session identifier, sent to AP 265 in step 922.

The M-L2S responds in step 924 by forwarding this layer 2 update frame to the RNC 230. This layer 2 update frame comprises the WLAN MAC address of the UT 240 as MAC source address and is preferably multicasted. The purpose of this layer 2 frame is to cause the forwarding or bridging tables in any layer 2 devices that receive the frame to be updated accordingly with the UT's 240 MAC address, i.e. to associate the port that received this frame with the UT's 240 MAC address, so that all future traffic destined to the UT 240 is forwarded to the correct port, i.e. on the port which received this frame. Assuming the use of multicast-enabled switches (M-L2Ss), in order to avoid flooding of layer 2 frames and thus too high traffic in operator's network, the layer 2 update frames is preferably multicast to a group, to which neighbouring AP:s, serving the RNC 230 and the corresponding M-L2S 201 belong. In this case, each AP thus knows the Layer 2 network topology to a certain extent, e.g. by having a stored table of MAC-addresses of its neighbouring AP:s and associated M-L2S:s. In one embodiment, the layer 2 update frame also comprises said PDP context session identifier, e.g. the RB ID or RAB ID or the IP-address of the PDP context session or the NSAPI, for the relevant session, sent by UT 240 to AP 265 in step 922.

In step 925A, the AP decides whether to send an IAPP-ADD.Notify packet or not, depending on how it is pre-configured. As a person skilled in the art realises, instead of an LAAP-ADD.Notify packet, a corresponding message according to another protocol could be used, e.g. a message complying with the LWAPP, as mentioned above. In one embodiment, the method proceeds to step 925 B and the AP 265 multicasts an IAPP-ADD.Notify packet as UDP/IP packet, in accordance with the IAPP protocol and IEEE 802 standard mobility functionality, to notify other AP:s about the new association of the particular UT at the (new) AP. The IAPP packet includes the UT's 240 WLAN MAC address and a sequence number, which indicates the packet's validity, in a conventional manner. The multicast IP address should preferably be selected so that only the RNC 230 and other AP:s, which are geographically close to the sending AP 265 receive the IAPP packet. This in order to reduce the signalling within the WLAN domain. The intermediate M-L2S 201 is therefore preferably pre-configured accordingly, i.e. it has a stored list of IP-addresses for multicasting the IAPP-ADD.Notify packet. Step 925B has the main purpose to inform the AP:s in the Layer 2 Network which AP actually is selected to communicate with the UT 240, so that a radio communication is handed over correctly from one AP to another. Step 925B constitutes part of conventional RRM (Radio Resource Management) of L2-RN:s. In one embodiment, the IAPP-ADD.Notify packet also comprises conventional WLAN Radio Resource Management parameters such as e.g. current cell load, signal strength etc for the established WLAN radio channel between UT 240 and AP 265. This may be carried out by adding said WLAN RRM parameters in a specific context container in the IAPP-ADD.Notify packet, as a person skilled in the art realises. In one embodiment, said IAPP-ADD.Notify packet also comprises said PDP context session identifier, e.g. the RB ID or RAB ID for the relevant session, sent from UT 240 to AP 265 in step 922. In an alternative embodiment, the method proceeds directly to step 926 from 925A and no APP-ADD.NOTIFY Packet is sent.

In step 926, according to one embodiment, the MRRM application of UT 240 forms and transmits a capability message as described in step 917 above, and the RNC MRRM application receives said message and extracts the relevant parameters and makes the appropriate associations, as described above with reference to step 919. In an alternative embodiment, in case no capability message has been sent at this point, the radio link message sent from UT 240 to AP 265 in step 922 may also comprise a PDP context session identifier, e.g. the 3GPP RB ID 1 or 3GPP RAB ID 1 for the relevant session, and this session identifier is forwarded to the RNC 230 e.g. with the layer 2 update frame to the RNC 230, or with said IAPP-ADD.Notify packet, as described in above steps 922, 923, 924 and 925, and hence the RNC MRRM application of RNC 230 may interpret the received layer 2 update frame described in step 924 or the IAPP-ADD.Notify packet described in step 925 as a capability message. In still another embodiment, the UT MRRM application of UT 240 forms a capability message comprising the UT's NA, i.e. the UT's 240 WLAN address in this case, the PDP context session identifier for the specific PDP context session established in step 920, i.e. the 3GPP RAB ID 1 or 3GPP RB ID 1 or the IP-address of the PDP context session or NSAPI, in this case, and transmits this capability message to the RNC 230 via the UTRAN path, e.g. by using the DCCH, or via the WLAN path by transforming said capability message into LLC 802.2 frame format and multicasting said LLC 802.2 frame to the AP 265. Alternatively, said capability message (LLC frame) is sent to the RNC 230 as a dedicated message in case the RNC's MAC address is known to the UT 240. The MRRM application of RNC 230 then receives this capability message and associates the NA, i.e. the WLAN address of UT 240 with the specific UT 240, with the specific PDP context session identifier, i.e. the 3GPP TEID 1, in the same manner as in step 919 above.

Furthermore, in step 926, the RNC 230 creates an alternative routing identifier, in the same manner as UT 240 in step 920, in form of a specific WLAN radio bearer identity for the specific PDP context session, here referred to as a WLAN RB ID 1 as illustrated in Table 4 below, and associates this WLAN RB ID 1 with the NA, i.e. the WLAN MAC address, of the UT 240 (received on port 2003), and also associates the WLAN RB ID 1 with port 2003. The WLAN RB ID 1 of RNC 230 and UT 240 are identical since they are defined by the same standard routing protocol scheme. The Routing application of RNC 230 associates the relevant PDP context session (i.e. session 1) with said NA (UT's 240 WLAN MAC address), said alternative routing identifier, i.e. WLAN RB ID 1, and port 2003, e.g. by updating its routing table as illustrated in Table 4. Thus, the alternative routing identifier is defined according to a standard protocol routing scheme of said alternative access network, i.e. the WLAN in this case. Alternatively, the alternative routing identifier is signalled to the RNC 230 from the UT 240. Since the alternative routing identifier is created according to the same criteria, e.g. regarding routing scheme, the alternative routing identifier is identical at RNC 230 and UT 240.

TABLE 4

| PDP Session | 3GPP RB ID | 3GPP RAB ID | UT | TEID | WLAN RB ID | NA | Data Port | GTP-U |
|---|---|---|---|---|---|---|---|---|
| Session 1 | RB ID 1 | RAB ID 1 | UT 1 | TEID 1 | WLAN RB ID 1 | UT's WLAN MAC address | 2003 | GTP-U 1 |
| Session 2 | RB ID 2 | RAB ID 2 | UT 1 | TEID 2 | | | | GTP-U 2 |
| Session N | RB ID N | RAB ID N | UT K | TEID N | | | | GTP-U N |

The RNC 230 continues to route user data of the PDP context session through the UTRAN radio interface, i.e. via port 2002, by continuing to bind the TEID of the PDP context session to the UTRAN (3GPP) RAB ID and the (3GPP) RAB ID to the (3GPP) RB ID. The method then proceeds to step 927, i.e. the TEID binds to the 3GPP RB ID.

In step 927, the UT MRRM application of UT 240 decides whether to send an association message to the RNC 230 or not, depending on its pre-configuration. The association message informs the RNC 230 that the UT 240 has established a radio connection with the WLAN and that a handover of the PDP context session from the UTRAN path to the WLAN path is possible. In one embodiment, e.g. in case a capability message was sent over the WLAN path in step 926, this capability message may also function as an association message and no association message is sent and the method proceeds to step 930. In another embodiment, the UT MRRM application of UT 240 decides to send an association message and the method proceeds to step 928.

In step 928, the UT MRRM application of UT 240 forms an association message comprising the UT's 240 NA, i.e. the WLAN address in this case, and preferably also a session identifier for the specific PDP context session, i.e. the 3GPP RAB ID 1 or RB ID 1 in this case, normally also along with some information stating that the UT 240 has established a radio connection with the WLAN, e.g. a "radio establishment identifier", and sends this association message to the RNC 230 over the UTRAN path, e.g. exploiting the DCCH, or, over the WLAN as a multicast frame message, or, in case the RNC's MAC address is known to the UT 240, e.g. it has been signalled over the UTRAN path from the RNC 230 at an earlier stage, the association message may be sent over the WLAN as a dedicated message having the RNC's MAC address as destination address. In case the association message is sent over the WLAN path, normally the association message does not comprise said "radio establishment identifier". Many possibilities exist how to form and combine the capability message and the association message. For instance, in case the association message also comprises the specific session identifier, the association message may also function as a capability message, and the method according to the invention does not require that the UT 240 send any specific capability message to the RNC 230. Thus, the terms "capability message" and "association message" are to some extent interchangeable according to the invention. Furthermore, an association message can be sent by the UT over the UTRAN path e.g. immediately after receiving the Association Response message from the AP 265 in step 922, but many possibilities exist. As stated above, the association message normally comprises information which uniquely identifies the specific PDP context session. In this way, the UT 240 can control which PDP context session/s, among a set of ongoing PDP context session/s, for which a handover may be desirable.

In step 929, the RNC 230 receives said association message, extracts the NA of UT 240, and possibly also the "radio establishment identifier" in case the association message comprises such an identifier, and updates its routing table (Table 4 above) accordingly by setting the alternative routing identifier, i.e. the WLAN RB ID 1 in this case, to become an actual active binding candidate for the session identifier, i.e. TEID 1, to bind to. This means that the RNC 230 from this point may route the PDP context session through the UTRAN radio interface, i.e. via port 2002, by binding the session identifier, i.e. the TEID, of the PDP context session to the first routing identifier, i.e. the (3GPP) RB ID in this case, or route the PDP context session through the WLAN radio interface, i.e. via port 2003, by binding the session identifier, i.e. the TEID in this case, of the PDP context session to the alternative routing identifier, i.e. the WLAN RB ID 1 in this case. In case the association message uniquely identifies a specific session, among a set of active PDP sessions for the UT 240, the RNC 230 updates only the specific alternative routing identifier, i.e. the WLAN RB ID 1 in this case, to become an actual active binding candidate for the session identifier to bind to. In case the association message does not identify a specific session, i.e. it comprises only the NA of UT 240 along with some information stating that the UT 240 has established a radio connection with the WLAN, then the RNC 230 normally updates all alternative routing identifiers, i.e. the WLAN RB ID 1 for session 1, WLAN RB ID 2 for session 2 and so on, for all PDP sessions, to become actual active binding candidates for all the session identifiers, i.e. TEID 1, TEID2 and so on, to bind to.

In one embodiment, e.g. in case the RNC 230 has received a capability message uniquely identifying the specific PDP context session, the "radio establishment identifier" may be omitted in the association message and the RNC 230 automatically interprets the association message accurately, since it is the second time the RNC 230 receives the NA of UT 240. The method then proceeds to step 930.

In step 930, a decision is taken to switch the routing of said PDP context session from said cellular radio network path (UTRAN path), via node B 250 and ports 2002 and 241, to said alternative data network path (WLAN path), via ports 2003 and 242. According to the invention, this decision may be taken by the UT 240 or the RNC 230 based on various RRM information. In one embodiment, the MRRM application of RNC 230 receives a RRM (radio resource management) message, comprising information regarding e.g. cell load, radio channel quality, BER, FER, from the WLAN's AP 265 by using the conventional WLAN radio resource management protocol, i.e. the IAPP protocol, as illustrated in FIG. 4. The AP 265 collects this RRM information by means of an installed conventional APME application and a cooperating conventional STAME application installed at UT 240, as illustrated in FIG. 4. The 802.11k signalling standard may be used in order to report the AP's 265 radio/cell-RRM information, e.g. channel load, traffic load, transmission success statistics, WLAN channel quality etc., for an 802.11 WLAN to the RNC 230. As discussed above with reference to step 925, the IAPP-ADD.Notify packet may comprise Radio Resource Management parameters such as cell load, signal strength, available data rates etc of the WLAN connection. In an alternative embodiment, the UT-MRRM application of UT 240 performs measurements regarding the radio link quality for both the UTRAN link and the WLAN link, and transmits a measurement report to the RNC MRRM application of 230, e.g. on the uplink DCCH, e.g. by exploiting the conventional UTRAN RLC protocol, or over the WLAN path by exploiting the LLC/WLAN-MAC protocol if the RNC's MAC-address is known to the UT 240, i.e. it has been signalled earlier. The measurement report may comprise parameter values regarding the signal strength, QoS, BER, FER, interference level, velocity of UT 240 etc for the UTRAN radio link/s and or WLAN radio link/s. The RNC-MRRM application of RNC 230 may take the decision in step 930 to perform a handover from the UTRAN routing path to the WLAN routing path e.g. if the WLAN currently offers a better/higher QoS level than the UTRAN or if the traffic load level of the UTRAN network exceeds a specific threshold value, or may decide to maintain the UTRAN routing path e.g. because the velocity of the UT 240 is too high, but many possibilities exist. In an alternative embodiment, the UT MRRM application of UT 240 takes the decision to switch the routing of the PDP context session to the WLAN routing path, e.g. based on said measured MRRM parameter values and/or radio resource management information received from AP 265, signalled using the cooperating STAME-APME applications, illustrated in FIG. 4. The UT 240 then signals this decision to the MRRM application of RNC 230. In one alternative embodiment, the WLAN routing path of the PDP context session is always preferred because of metering parameters, i.e. cost/minute or transferred Kbit. What is important is that the invention provides a possibility to provide MRRM functionality in the RNC 230 and/or the UT 240 enabling e.g. handover decisions taking into account the exploitation of the radio resources of both said UTRAN and WLAN. In this way, the invention provides a possibility to develop completely new and more efficient MRRM functionality which takes into account both the UTRAN and other integrated L2-RN, since the RNC 230 and/or UT 240 has access to both UTRAN and WLAN RRM information. Alternatively, the invention provides a possibility to provide a MRRM functionality at the AP 265. In a preferred embodiment, the MRRM of RNC 230 takes the handover decisions. It should be noted that the invention gives a possible advantage of collecting all the MRRM information in the "right" node, i.e. in the radio network control node, RNC 230, in which the conventional UTRAN RRM-functions are realised.

According to the method of the invention, the method remains in step 930 until a decision has been taken to handover the PDP context session to the WLAN routing path, and then proceeds to step 931.

In step 931, in one embodiment, the RNC 230 executes the handover of the PDP context session from said cellular radio network path to said WLAN routing path, i.e. switches user plane transmission from the UTRAN path to the WLAN path. The handover is executed by the Routing application of RNC 230 which binds the PDP context session identifier, normally the TEID, to the alternative radio bearer identity, i.e. the WLAN RB ID 1 in this case, instead of to the conventional 3GPP RB ID, in table 4, thereby starting to route downlink IP packets of the PDP session through the WLAN routing path via port 2003, instead of through the UTRAN path via port 2002. The transmission switch is crucial for the downlink IP packets received by RNC 230 from SGSN 220 through the corresponding GTP-U tunnel. In conventional user plane transmission the RNC decapsulates the IP packets from the GTP-U PDU and encapsulates them with PDCP prior to transmission over UTRAN channels. The invention allows seamless transmission switching without data loss by having the Routing application entity of RNC 230 carrying out the following steps:

1. All downlink IP packets that have already been encapsulated and cached as PDCP packets before the inter-RAT (Radio Access Technology) handover is decided, are transmitted to the UT 240 using the UTRAN path. Such IP packets may be cached at RNC 230 because they are waiting for their transmission or they have been transmitted to UT 240 but have not yet been confirmed. As long as RNC receives uplink IP packets from UT 240 through its UTRAN routing path, the RNC's 230 RLC entity acknowledges the packet reception using the UTRAN path (in case that RLC acknowledged mode is used), according to the invention.

2. In case that an acknowledged mode RLC service is configured in the PDP context for user plane transmission, an LLC connection set-up is normally first carried out between the LLC entities at the RNC 230 and the UT 240 to allow acknowledged transmissions of LLC type 2 frames. This is normally done by letting the RNC 230 send a LLC set up connection message frame to UT 240, before the first (downlink) PDP-IP packets are transmitted as Ethernet 802.3 frames, using the LLC type 2 connection service (acknowledged mode).

3. All downlink IP packets de-capsulated from the GTP-U PDUs after the inter-RAT handover is decided in step 930, are encapsulated as LLC/Ethernet frames with the UT's 240 WLAN MAC address as destination address and RNC's 230 MAC address as source address. These frames are then sent through the RNC's 230 (Ethernet) port 2003 towards the UT through one or several M-L2Ss and the WLAN AP 265.

The downlink LLC/Ethernet frames created in the RNC 230 in step 931 are then transmitted on RNC's 230 port 2003 to the M-L2S 201. These are LLC/Ethernet 802.3 frames comprising the downlink PDP IP packets. Since the M-L2S 201 has updated its bridging tables in steps 903, these downlink Ethernet frames are routed accurately through the WLAN towards UT 240 in step 931. In one embodiment, the RNC Routing application entity adds a session identifier for the specific session, e.g. the WLAN RB ID 1 or 3GPP RB ID 1 in this case, in the RNC-MRRM application header before encapsulating the downlink packets as LLC/Ethernet frames. This provides a possibility for the UT-Routing application of UT 240 to uniquely identify the specific PDP session to which downlink PDP IP packet relates, when received via the WLAN routing path via port 242. User session data of the LLC 802.3 downlink packets transmitted over the WLAN path are now encrypted by the AEE, described above in FIGS. 4A and B, 7B and 8. ARRC downlink messages are now transmitted, along with their associated digests, AMAC-I, over the WLAN path, by means of the ARRC protocol, described e.g. in FIG. 4B. The digest AMAC-I is formed by the AAE, as described above in FIGS. 4B, 7D and 8.

In step 932, the M-L2S 201 forwards the received downlink LLC/Ethernet 802.3 frames to the AP 265. The AP 265 transforms the downlink IEEE 802.3 frames to conventional IEEE 802.11 frames and transmits these to the UT 240.

In step 934, according to one embodiment, the UT 240 switches the routing path of said PDP context session from the UTRAN routing path to the alternative WLAN routing path after receiving the alternative network source address of RNC 230, NSA, i.e. the MAC address of RNC 230 in this case. For instance, the UT 240 may extract said NSA from said LLC set up connection frame according to one embodiment, or when it receives the first PDP context downlink IP packets from RNC 230, having the destination IP address of the UT 240 embedded in a LLC/MAC frame comprising the RNC's 230 MAC address as source address, according to another embodiment. Alternatively, the RNC's 230 MAC address was signalled to the UT 240 at an earlier stage through the UTRAN path. The Routing application of UT 240 then updates its routing table by associating the session identifier/s with the RNC's NSA, i.e. the MAC address of RNC 230 in this case, as illustrated in table 5 below.

TABLE 5

| PDP Session | 3GPP RB ID | 3GPP RAB ID | NSAPI | NSA of RNC | WLAN Radio Bearer ID | Application |
|---|---|---|---|---|---|---|
| Session 1 | RB ID 1 | RAB ID 1 | NSAPI 1 | RNC's MAC address | WLAN RB ID 1 | Web browsing |
| Session 2 | RB ID 2 | RAB ID 2 | NSAPI 2 | | | E-mail |
| Session N | RB ID N | RAB ID N | NSAPI N | | | Multimedia download |

In the embodiment wherein the UT 240 executes said routing path handover after having received the first PDP-IP packets, the UT 240 decapsulates the received downlink IP-PDP packets from the LLC/802.11 frames and identifies that the WLAN transmission path is successfully set up since it can receive PDP user data via its WLAN interface. The UT 240 then updates its routing table, i.e. table 5, accordingly by binding the relevant PDP context session identifier, i.e. 3GPP RAB ID 1 to the WLAN RB ID 1. The UT 240 thus terminates its uplink transmission through its UTRAN transmission port 241 and starts to transmits the subsequent uplink PDP IP packets through its WLAN port 242, as LLC/Ethernet 802.11 frames to AP 265. More specifically, in one embodiment, the switch of user plane transmission at the UT 240 comprises the following steps, carried out by the Routing application entity of UT 240:

1. As similarly done by RNC 230 for downlink IP packets, all uplink IP packets that have been encapsulated and cached as PDCP packets at UT 240 before deciding the inter-RAT transmission switch, are transmitted to the RNC 230 using the UTRAN path, i.e., using the allocated UTRAN radio bearers/channels. Such IP packets might be cached because they are waiting for their transmission or that they have been transmitted to RNC but not yet acknowledged. As long as UT 240 receives downlink IP packets from RNC 230 through its UTRAN transmission path, UT's RLC entity acknowledges the packet reception using the UTRAN path, too (in case that RLC acknowledged mode is used).

2. As indicated in the DSAP (Destination Service Access Point) field of the received LLC frames through its WLAN interface, the extracted payload, i.e., downlink PDP IP packets, shall be forwarded to the overlying IP layer at UT.

3. After receiving the first downlink IP packet through its WLAN port 242, the Routing application of UT 240 binds the data session identifier, i.e. the 3GPP RAB ID 1, to the alternative routing identifier, i.e. the WLAN RB ID 1, which means that it stops encapsulating the uplink PDP IP packets with PDCP and instead encapsulates them as LLC/802.11 frames using the UT's 240 WLAN MAC address as source address and RNC's 230 MAC address as destination address. These frames are then sent via the WLAN interface through port 242 to AP 265. User session data of the LLC 802.3 uplink packets transmitted over the WLAN path are now encrypted by the AEE, described above in FIGS. 4A and B, 7B and 8. ARRC uplink messages are now transmitted, along with their associated digests, AMAC-I, over the WLAN path, by means of the ARRC protocol, described e.g. in FIG. 4B. The digest AMAC-I is formed by the AAE, as described above in FIGS. 4B, 7D and 8.

In step 936, the AP 265 transforms the IEEE 802.11 uplink frames from UT 240 to IEEE 802.2 frames and transmits these to the M-L2S 201. The M-L2S 201 then forwards these IEEE 802.2 frames to the RNC 230.

In step 938, the Routing application of RNC 230 extracts the PDP IP packets from the received IEEE 802.2 LLC/Ethernet frames, transforms them to conventional PDP IP packet frames, encapsulates them and forwards them to the corresponding GTP-U entity for further GTP-U encapsulation and transmission through the GTP-U tunnels towards the UMTS PS (Packet Switched) domain. The identification of the particular GTP-U entity and tunnel is made by using the one-to-one relationship between UT's WLAN MAC address (indicated as source address of the Ethernet frames), the WLAN RB ID 1 and the TEID 1 established for the PDP context in question, e.g. as illustrated in Table 4. Thus, the handover of the PDP context session in the up- and downlink from the UTRAN routing path to the WLAN routing path is completed by the RNC 230 in step 938.

Note that the encapsulation of IP packets with GTP-U between RNC 230 and SGSN 220, as well as between SGSN 220 and GGSN 210 remain unchanged at any point in time. No change in addresses of the IP packets is made either. This is advantageous in order to provide session continuity with the remote Internet host or peer and eliminates the delay caused by DHCP (Dynamic Host Protocol Configuration) for assigning a new IP address.

Even though the handover of a PDP context session from a UTRAN routing path to a WLAN routing path has been described above, the invention is applicable also for the handover of a PDP context session, or data session, from a WLAN routing path to a UTRAN routing path, with minor modifications obvious for a person skilled in the art. For instance, in case of a handover from the WLAN routing path to the UTRAN routing path, e.g. if the data session is first established via the WLAN routing path, then the capability message may be sent over the WLAN routing path and may comprise e.g. the WLAN RB ID 1 uniquely identifying said data session and further comprising the IMSI of UT 240, allowing the RNC 230 to set up alternative 3GPP RAB ID and 3GPP RB ID corresponding with the WLAN RB ID QoS requirements and defining a data session with the UT 240 over the UTRAN path, etc. Furthermore, the invention may be used to simultaneously route PDP packets, or session data, over both the WLAN routing path and the UTRAN routing path, e.g. in order to form a soft handover or to simply enhance the throughput for any reason.

The RNC 230 initiates the handover, and the UT 240 switches its routing path after having received the first PDP-packets as described in steps 931-934 above, but many other possibilities exist. For instance, the UT 240 could initiate the handover and the RNC 230 may switch the routing path after receiving the first up-link PDP packets. The UT/RNC 240/230 may take a handover decision independently of RNC/UT 230/240, and perform a handover independently, and/or may signal a handover decision to the RNC/UT 230/240, e.g. by means of a RRC-message, in order to "synchronise" the handover with the RNC/UT 230/240.

Figure 10A:
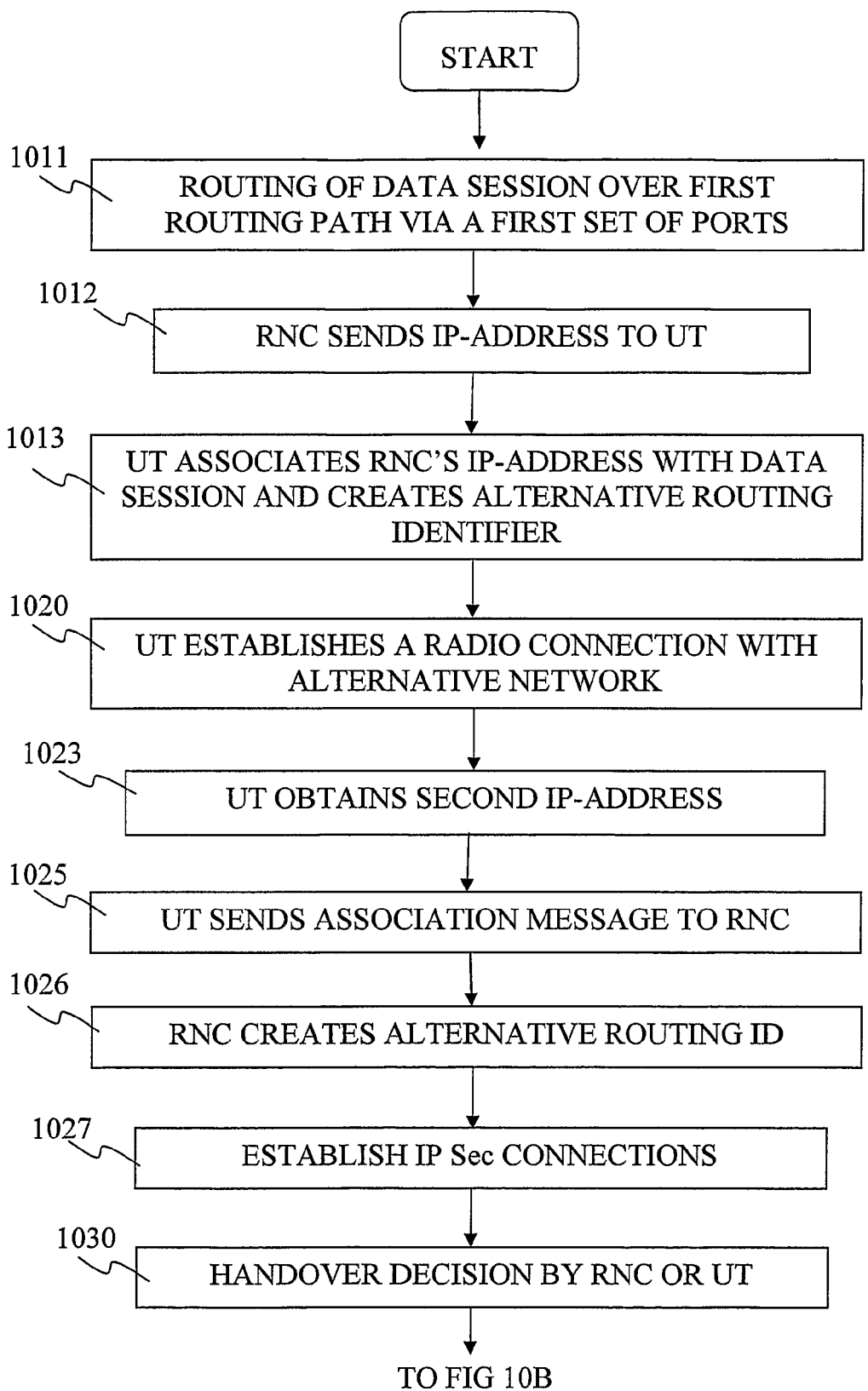
FIG. 10A-B show a flow chart illustrating a handover procedure according to an alternative embodiment of the invention.
Figure 10B:
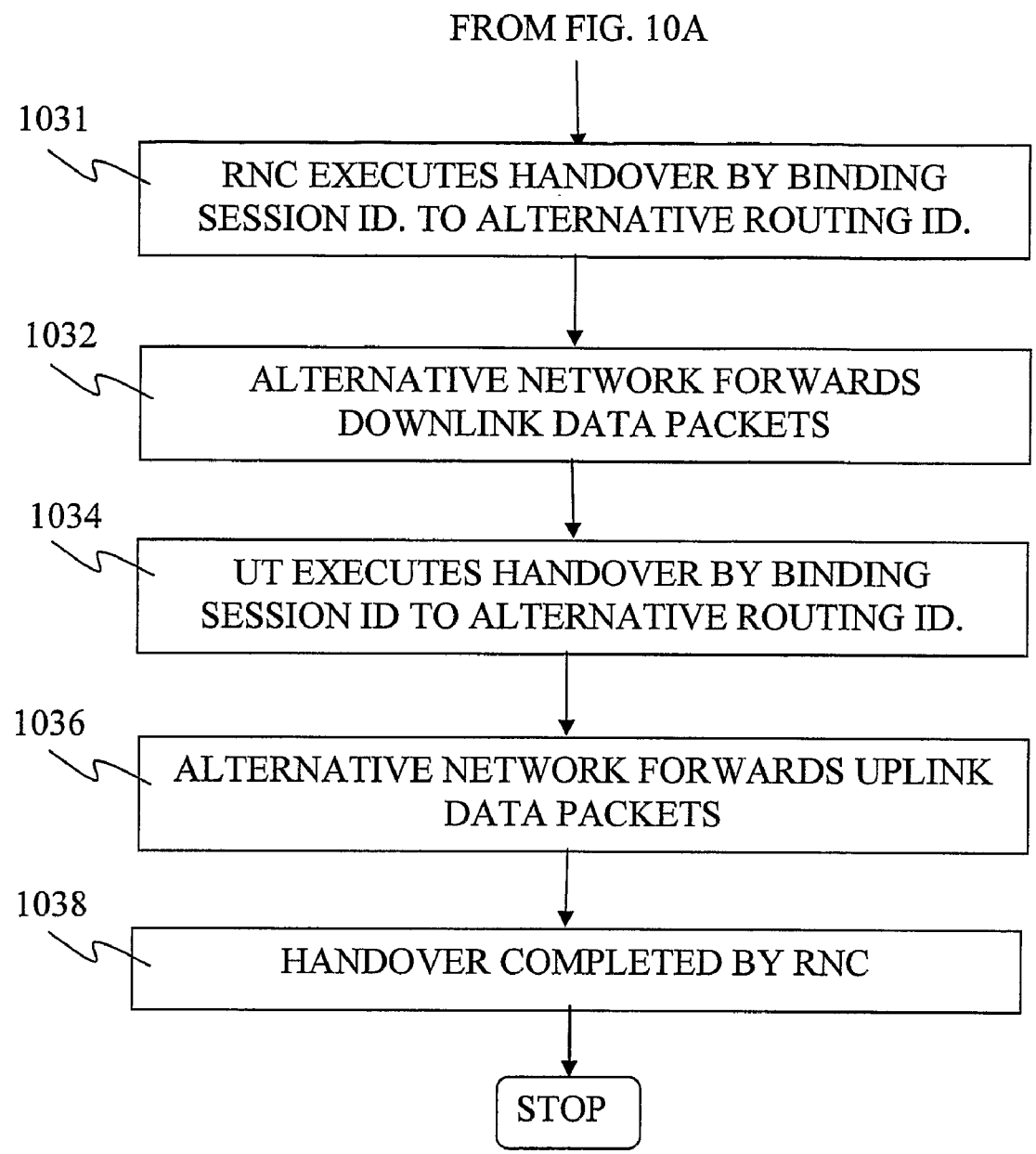

FIGS. 10A-B illustrate the method for performing a handover of a PDP context data session from the UTRAN radio network routing path (associated with ports 541 and 5002) to the alternative WLAN-IP network routing path (associated with ports 542 and 5003) in FIG. 5, according to one embodiment of the present invention associated with the network architecture depicted in FIGS. 5 and 6. The method according to this embodiment of the invention shall now be described in more detail with reference to FIGS. 5,6 and 10A-B.

Referring to FIG. 10A-C, the method according to the invention starts in step 1011.

In step 1011, data of said PDP context session are routed over the first routing path, i.e. the UTRAN routing path, in a conventional manner as described above.

In step 1012, the MRRM application of RNC 530 sends its alternative network source address, NSA, i.e. the IP address of RNC 530, to the MRRM application of UT 540, e.g. over the downlink UTRAN-DCCH. In an alternative embodiment, the RNC does not send its NSA in step 1012, instead the RNC's 530 IP-address is known by the DHCP server (pre-stored) and the RNC's 530 IP-address is instead included e.g. in the DHCP Acknowledge message described below in step 1023.

In step 1013, the MRRM of UT 540 updates the routing table of the UT Routing application by associating the PDP context session/s with the received NSA, i.e. the IP address of RNC in this case, as illustrated in table 6 and creates an alternative routing identifier for the relevant data session, i.e. a WIP RB ID, and associates it with port 542. The WIP RB ID 1 is associated with the IP address of RNC 530.

TABLE 6

| PDP Session | 3GPP RB ID | 3GPP RAB ID | NSA | WIP RB ID | Application |
|---|---|---|---|---|---|
| Session 1 | RB ID 1 | RAB ID 1 | IP-address of RNC | WIP RB ID 1 | Web browsing |
| Session 2 | RB ID 2 | RAB ID 2 | IP-address of RNC | | E-mail |
| Session N | RB ID N | RAB ID N | IP-address of RNC | | Multimedia download |

In step 1020, the Routing application of UT 540 detects the WLAN (broadcast) beacon signal from AP 565, and the UT establishes a radio connection with the WLAN via said second port (542), as described in step 522 above. The WLAN forwards update frames to the Access Router 5010, and the bridging tables of the WLAN and the Access router 5010 are updated accordingly, in a conventional manner.

In step 1023, the UT 540 obtains a second IP address from the DHCP server 5015, in addition to its already assigned PDP context session IP address. This requires that the UT 540 has a DHCP client installed. The assignment of a second IP-address to the UT 540 is normally carried out in the following way:

1. The UT 240 broadcasts a DHCP Discover message as a DHCP/UDP/IP message.

2. The DHCP Server 5015 responds the UT 540 by sending a DHCP Offer message, which comprises a second IP address for the UT 240 as a DHCP/UDP/IP message. In case the broadcasted Discover message reaches several DHCP Servers, there may be multiple DHCP Offers sent by different DHCP Servers. The second IP address is normally an IP-address dedicated for mobile applications, i.e. an IPm address.

3. The UT 240 broadcasts a DHCP Request message (i.e. a request for one of the offered IP addresses from one DHCP server) as a DHCP/UDP/IP message.

4. The DHCP Server 5015 sends a DHCP Acknowledge message (i.e. acknowledges a reserved IP address and configuration for the UT 540) as a DHCP/UDP/IP message to the UT 240 which observes this acknowledgment and stores the reserved (second) IP address for future use. This second IP address is forwarded to the UT RRC application, which associates this second IP address with the relevant PDP context session/s. Optionally, the DHCP Acknowledge message may also comprise the RNC's 530 IP-address, if known to the DHCP server, 5015.

In step 1025, the MRRM application of UT 540 forms and sends an association message to the MRRM application of RNC 530. The association message comprises the alternative network address of UT 540, i.e. the second IP-address in this case, and also functions as a capability message as described above. In one embodiment, the association message further comprises a session identifier uniquely identifying the data session, e.g. the 3GPP RB ID 1 or the 3GPP RAB ID 1, uniquely identifying the specific PDP data context session established in step 1010. In this way, the UT 540 can control which PDP context session/s, among a set of ongoing PDP context session/s, for which a handover may be desirable. This may be accomplished by letting the UT 540 send said association message over the UTRAN path exploiting said 3GPP RB ID and 3GPP RAB ID, so that the RNC 530 can extract said 3GPP RB ID and 3GPP RAB ID, which uniquely identify the specific PDP context session. Alternatively, the association message may be sent over the WLAN-IP-Network path as a TCP/IP packet addressed to the RNC's 530 MRRM application. In one embodiment, the DHCP server 5015 sends an association message to the RNC 530 comprising the UT's 540 MAC address and second IP-address. This message may be a dedicated message if the RNC's 530 IP-address is known (pre-stored) to the DHCP-server, or may be multicasted.

In step 1026, the RNC 230 receives said association message sent in step 1025 and creates an alternative routing identifier, in form of a specific IP network radio bearer identity for the specific PDP context session in this case, i.e. a IPN RB ID 1 as illustrated in Table 4 below, and associates this IPN RB ID 1 with the NA, i.e. the second IP address of the UT 240, and also associates the IPN RB ID 1 with port 2003. The RNC 530 associates said PDP context session (i.e. the relevant session in question) with said NA (UT's 540 second IP address), said alternative routing identifier, i.e. IPN RB ID 1, and port 2003, e.g. by updating its routing table as illustrated in Table 7. In a similar manner as for the 3GPP RB ID and WLAN RB ID, the IPN RB ID defines a connection over the IP-network-WLAN-network path, and comprises e.g. the identical QoS requirements, i.e. bandwidth requirements, max packet delay requirement, requirements regarding BER, FER etc, as the corresponding 3GPP RB ID, in order for the lower layers to realise a data connection between the Routing applications of RNC 530 and the UT 540.

TABLE 7

| PDP Session | 3 GPP RB ID | 3 GPP RAB ID | UT | TEID | IPN RB ID | NA | Data Port | GTP-U |
|---|---|---|---|---|---|---|---|---|
| Session 1 | RB ID 1 | RAB ID 1 | UT 1 | TEID 1 | IPN RB ID 1 | UT's second IP-address | 5003 | GTP-U 1 |
| Session 2 | RB ID 2 | RAB ID 2 | UT 1 | TEID 2 | | | | GTP-U 2 |
| Session N | RB ID N | RAB ID N | UT K | TEID N | | | | GTP-U N |

The Routing application of RNC 530 continues to route user data of the PDP context session through the UTRAN radio interface, i.e. via port 5002, by continuing to bind the TEID of the PDP context session to the UTRAN (3GPP) RAB ID and the UTRAN (3GPP) RB ID. In one embodiment, the method then proceeds to step 1027. In another embodiment, the method skips step 1027 and proceeds directly to step 1030.

In step 1027, the RNC 530 and UT 540 establish a conventional bi-directional IPSec (IP Secure) connection according to one embodiment, enabling the secure encryption and authentication/integrity protection for the packets to be communicated over the WLAN-IP-network 5050 path. This requires that the RNC 530 and the UT 540 has further a respective IPSec application installed, and is normally carried out by setting up a conventional so called IPSec Security Association (SA) in each direction between the UT 540 and the RNC 530. PDP context packets may thereafter be communicated safely over these IPSec connections. The security association credentials may be exchanged between UT 540 and RNC 530 over a secure (encrypted) established UTRAN (WCDMA) connection. The method then proceeds to step 1030.

In step 1030, a decision is taken to switch the routing of said PDP context session from said cellular radio network path (UTRAN path), via node B 550 and ports 5002 and 541, to said alternative data network path (WLAN-IP-network path), via ports 5003 and 542. According to the invention, this decision may be taken by the UT 540 or the RNC 530 based on various RRM information. In one embodiment, the MRRM application of RNC 530 receives a RRM message, comprising information regarding e.g. signal strength, QoS, BER, FER, interference level, velocity of UT 540, cell load, radio channel quality, etc. regarding the UTRAN network and/or the WLAN-IP network, from the MRRM application of UT 540. This message may be sent over the UTRAN routing path, e.g. on DCCH, or over the WLAN-IP-network as a TCP/IP message. The MRRM application of UT 540 performs measurements regarding the radio link quality for both the UTRAN link and the WLAN link, so as to form such RRM message/s or measurement reports. Alternatively, RRM-information could be collected by the AP 565 or Access Router 5010 and transmitted to the RNC 530 as a dedicated message (e.g. in form of a modified IAPP message) in case that the dedicated control connection for this purpose exist between the AP and AR and RNC 530, alternatively the AP sends the RRM messages into the alternative wireless data network (e.g. the IEEE 802 Layer 2 WLAN network), which forwards them into the IP-network via the AR 5010, which in turn forwards them to the RNC 530. The AR can directly send the RRM messages into the IP-network. The RNC 530 may continuously listen for RRM messages (e.g. listening to specific IAPP distribution address for modified IAPP RRM messages), extract and filter out RRM message related to specific cells (i.e. comprising specific WLAN cell ID) and/or related to specific users (e.g. comprising UT's MAC address or UT's IP address). The RNC-MRRM application of RNC 530 may take the decision in step 1030 to perform a handover from the UTRAN routing path to the WLAN-IP network routing path e.g. if the WLAN-IP network currently offers a better/higher QoS level than the UTRAN or if the traffic load level of the UTRAN network exceeds a specific threshold value, or may decide to maintain the UTRAN routing path e.g. because the velocity of the UT 540 is too high, but many possibilities exist. In an alternative embodiment, the UT MRRM application of UT 540 takes the decision to switch the routing of the PDP context session to the WLAN routing path, e.g. based on said measured MRRM parameter values. What is important is that the invention provides a possibility to provide MRRM functionality in the RNC 530 and/or the UT 540 enabling e.g. handover decisions taking into account the exploitation of the radio resources of both said UTRAN and the WLAN-IP network. In this way, the invention provides a possibility to develop completely new and more efficient MRRM functionality since the RNC 530 and/or UT 540 has access to both UTRAN and WLAN RRM information. In a preferred embodiment, the MRRM application of RNC 530 takes the handover decisions. It should be noted that the invention gives the possible advantage of collecting all the MRRM information in the "right" node, i.e. in the radio network control node, RNC 530, in which the conventional UTRAN RRM-functions are realised.

According to the method of the invention, the method remains in step 1030 until a decision has been taken to handover the PDP context session to the WLAN-IP NETWORK routing path, and then proceeds to step 1031.

In step 1031, in one embodiment, the RNC 530 executes the handover of the PDP context session from the first, i.e. said cellular radio network path, to said alternative, i.e. WLAN-IP network routing path, i.e. switches user plane transmission from the UTRAN path to the WLAN-IP Network path. The handover is executed by the Routing application of RNC 530 which binds the PDP context session identifier, i.e. TEID 1 in this case, to the alternative radio bearer identity, i.e. the IPN RB ID 1 in this case, instead of to the conventional 3GPP RB ID, in table 7, thereby starting to route downlink IP packets of the PDP session through the WLAN-IP Network routing path via port 5003, instead of through the UTRAN path via port 5002. The transmission switch is crucial for the downlink IP packets received by RNC 530 from SGSN 520 through the corresponding GTP-U tunnel. In conventional user plane transmission the RNC decapsulates the IP packets from the GTP-U PDU and encapsulates them with PDCP prior to transmission over UTRAN channels. The invention allow seamless transmission switch without data loss by having the Routing application entity of RNC 530 carrying out the following steps:

1. All downlink IP packets that have already been encapsulated and cached as PDCP packets before the inter-RAT (Radio Access Technology) handover is decided, are transmitted to the UT 540 using the UTRAN path. Such IP packets may be cached at RNC 530 because they are waiting for their transmission or they have been transmitted to UT 540 but have not yet been confirmed. As long as RNC receives uplink IP packets from UT 540 through its UTRAN routing path, the RNC's 530 RLC entity acknowledges the packet reception using the UTRAN path (in case that RLC acknowledged mode is used), according to the invention.

2. In case that an acknowledged mode RLC service is configured in the PDP context for user plane transmission over the UTRAN path, then a conventional acknowledged TCP/IP mode transmission is used between the Routing applications of UT 540 and RNC 530.

3. All downlink IP packets de-capsulated from the GTP-U PDUs after the inter-RAT handover is decided in step 530, are encapsulated as Routing application TCP/IP packets with the UT's 540 second IP address as destination address and RNC's 530 IP address as source address. These frames are then sent through the RNC's 530 port 5003.

The created downlink TCP/IP packets are then transmitted on RNC's 530 port 5003. These are TCP/IP Routing application packets, i.e. the TCP header defines them to be Routing application packets destined for the Routing application of UT 540, comprising the embedded downlink PDP IP packets. User session data of the IPSec downlink IP packets transmitted over the WLAN-IP-Network path are now encrypted by the AEE, described above in FIGS. 6, 7B and 8. ARRC downlink messages are now transmitted, along with their associated digests, AMAC-I, over the WLAN-IP-Network path, by means of the ARRC protocol, described e.g. in FIG. 4B. The digest AMAC-I is formed by the AAE, as described above in FIGS. 4B, 7D and 8.

In step 1032, the IP-Network and WLAN routes these downlink IP-packets to the UT 540, since their bridging tables are updated accordingly and transmits these to the UT 540.

In step 1034, the UT 540 switches the routing path of said PDP context session from the UTRAN routing path to the alternative WLAN-IP NETWORK routing path after receiving the alternative network source address of RNC 530, NSA, i.e. the IP address of RNC 530 in this case. The Routing application of UT 540 updates its routing table by associating the session identifier/s with the RNC's NSA, i.e. the IP address of RNC 530 in this case, as illustrated in table 8 below.

cifically, in one embodiment, the switch of user plane transmission at the UT 540 comprises the following steps, carried out by the Routing application entity of UT 540:

1. As similarly done by RNC 530 for downlink IP packets, all uplink IP packets that have been encapsulated and cached as PDCP packets at UT 540 before deciding the inter-RAT transmission switch, are transmitted to the RNC 530 using the UTRAN path, i.e., using the allocated UTRAN radio bearers/channels. Such IP packets might be cached because they are waiting for their transmission or that they have been transmitted to RNC but not yet acknowledged. As long as UT 540 receives downlink IP packets from RNC 530 through its UTRAN transmission path, UT's RLC entity acknowledges the packet reception using the UTRAN path, too (in case that RLC acknowledged mode is used).

2. As indicated in the DSAP (Destination Service Access Point) field of the received TCP/IP packets, the extracted payload, i.e., downlink PDP IP packets, shall be forwarded to the overlying IP layer at UT.

3. After receiving the first downlink IP packet through its port 542, the Routing application of UT 540 stops encapsulating the uplink PDP IP packets with PDCP and instead encapsulates them as TCP/IP frames using the UT's 540 second IP address as source address and RNC's 530 IP address as destination address. These frames are then sent through port 542. User session data of the LLC 802.3 uplink packets transmitted over the WLAN-IP-Network path are now encrypted by the AEE, described above in FIGS. 6, 7B and 8. ARRC uplink messages are now transmitted, along with their associated digests, AMAC-I, over the WLAN path, by means of the ARRC protocol, described e.g. in FIG. 4B. The digest AMAC-I is formed by the AAE, as described above in FIGS. 4B, 7D and 8.

In step 1036, the WLAN-IP-Network forwards these packets to the RNC 530.

In step 1038, the Routing application of RNC 530 extracts the PDP IP packets from the received TCP/IP packets, transforms them to conventional PDP IP packet frames, encapsulates them and forwards them to the corresponding GTP-U entity for further GTP-U encapsulation and transmission through the GTP-U tunnels towards the UMTS PS (Packet Switched) domain. The identification of the particular GTP-U entity and tunnel is made by using the one-to-one relationship between UT's second IP address (indicated as source address

TABLE 8

| PDP Session | 3GPP RB ID | 3GPP RAB ID | NSAPI | NSA of RNC | IPN Radio Bearer ID | Application |
|---|---|---|---|---|---|---|
| Session 1 | 3GPP RB ID 1 | 3GPP RAB ID 1 | NSAPI 1 | RNC's IP address | IPN RB ID 1 | Web browsing |
| Session 2 | 3GPP RB ID 2 | 3GPP RAB ID 2 | NSAPI 2 | | | E-mail |
| Session N | 3GPP RB ID N | 3GPP RAB ID N | NSAPI N | | | Multimedia download |

The Routing application of UT 540 decapsulates the received downlink IP-PDP packets from the TCP/IP packets The UT 540 then updates its routing table, i.e. table 8, accordingly by binding the relevant PDP context session identifier, i.e. UTRAN RAB ID 1 to the IPN RB ID 1 for uplink IP packet transmission via port 542 instead of UTRAN port 541. The UT 540 thus terminates its uplink transmission through its UTRAN transmission port 541 and starts to transmit the subsequent uplink PDP IP packets through port 542, as TCP/IP frames to the RNC's 530 Routing application. More speof the TCP/IP packets), and the TEID established for the PDP context in question, e.g. as illustrated in Table 7. Thus, the handover of the PDP context session in the up- and downlink from the UTRAN routing path to the WLAN routing path is completed by the RNC 530 in step 1038.

Note that the encapsulation of IP packets with GTP-U between RNC 530 and SGSN 520, as well as between SGSN 520 and GGSN 510 remain unchanged at any point in time. This is advantageous in order to provide session continuity with the remote Internet host or peer.

In one embodiment of the invention, the UTRAN radio bearer between UT 540 and RNC 530 will not be released even though no user plane traffic is transmitted over the UTRAN path. This is advantageous since the UTRAN path then can be used for sending MRRM messages regarding the UTRAN and/or the alternative access network, e.g. WLAN or WLAN-IP-Network, throughout the data session. Furthermore, this facilitates a seamless session handover from the alternative routing path back to the UTRAN routing path at a later stage and enables an efficient mobility management, e.g. in case of location area update for the UTRAN etc.

Of course, the handover may first be executed by the UT 540 or the RNC 530, independently, or synchronously, in a similar manner described with reference to FIG. 5 above. The PDP-packets may also simultaneously be routed over both the routing paths, for any reason. Many possibilities exist, as a person skilled in the art realises.

The method according to the invention is realised by the MRRM entities, Routing entities, Encryption Entities, EE, alternative Encryption Entities, AEE, Authentication Entities, AE, and Alternative Authentication Entities, AAE, of UT (240, 540) and RNC (230, 530), which normally are realised by means of software program/s comprising program code means loaded in processing means, e.g. CPU:s, at the UT 240, 540 and RNC 230, 530 respectively, which code means when loaded in said processing means in the UT 240, 540 and RNC 230, 530 respectively, executes at least one procedure realising the method according to the invention, but other hardware options exist, obvious for a person skilled in the art. The software program may be stored in e.g. RAM memory/ies at UT 240, 540 and RNC 230, 530, respectively, and on a computer readable medium, such as a CD-ROM, flash memory etc, allowing an efficient distribution/installation.

The principles of the present invention have been described in the foregoing by examples of embodiments or modes/examples of operations, i.e. in the case that the L2-RN is a WLAN and in the case of a data session handover from a UTRAN transmission path to e.g. a WLAN transmission path. However, as already stated, the invention is applicable for any integrated UTRAN—L2-RN and many modifications and/or combinations are possible. For instance, in case the L2-RN comprises a WMAN, IEEE 802.16, then the AP 265 would transform the IEEE 802.3 frames to 802.16 MAC frames instead of 802.11 frames, referring to FIGS. 2, 3, 4 and 5 above, as a person skilled in the art realises. Therefore, the invention should not be construed as being limited to the particular embodiments/working examples discussed above, and it should be appreciated that variations may be made in those embodiments/working examples by persons skilled in the art, without departing from the scope of the present invention as defined by the appended claims.

The invention claimed is:

1. A method for ciphering and transmitting data, to be used by a communication device being arranged to transmit data through a first data port according to a first transmission protocol, and to form ciphered data by subjecting the data to a ciphering algorithm being fed with a first set of ciphering parameters, comprising a ciphering parameter CP5 having a bit length, CP5BL; said device being further arranged to transmit data through a second data port according to an alternative transmission protocol, said method comprising the steps of:
   defining an alternative ciphering parameter, ACP, having a bit length being equal to said CP5BL,
   forming a second set of ciphering parameters by substituting said CP5 with said ACP in said first set of ciphering parameters,
   forming ciphered data by subjecting the data to said ciphering algorithm being fed with said second set of ciphering parameters,
   transmitting said ciphered data through said second data port according to said alternative transmission protocol, and
   wherein said ciphering algorithm is an encryption algorithm and said first set of ciphering parameters is a first set of encryption parameters comprising a first encryption parameter, EP1, having a specific bit length and being a function of a parameter defined by said first transmission protocol, said device being arranged to form encrypted data by processinq the data with an encryption key bit stream, EKS1, formed by said encryption alqorithm being fed with said first set of encryption parameters, said method further comprisinq the steps of:
      defininq at least one alternative encryption parameter, AEP1, beinq a function of a parameter defined by said alternative transmission protocol and having a bit length being equal to a bit length of said EP1,
      forming a second set of encryption parameters by substituting said EP1 with said AEP1 in said first set of encryption parameters,
      forming an alternative encryption key bit stream, AEKS, by feeding said encryption algorithm with said second set of encryption parameters, and,
      encrypting the data by processing the data with said AEKS.

2. The method according to claim 1 comprising the step of: defining said ACP to equal said CP5.

3. The method according to claim 1 wherein said first transmission protocol defines first data frames wherein data in each frame is associated with a number, NR1 ; said EP1 being a function of said NR1, and wherein said alternative transmission protocol defines alternative data frames, said method characterised in that it comprises the following steps:
   defining an alternative frame number, ANR, for each of said alternative data frames,
   defining said alternative encryption parameter, AEP1, to be a function of said ANR.

4. The method according to claim 3 wherein said NR1 is defined as a combination of a first hyper-frame sequence number, HYPFSN1, and a first frame sequence number, FSN1; the method further comprising the steps of:
   defining an alternative frame sequence number, AFSN, for said alternative data frames,
   defining an alternative hyper-frame as a set of consecutive alternative frames, and assigning each alternative hyper-frame a sequence number, AHYPFSN,
   defining said ANR as being a combination of said AHYPFSN and AFSN.

5. The method according to claim 4 wherein said first transmission protocol, said first set of encryption parameters and said encryption algorithm are defined according to a 3GPP standard protocol and said alternative transmission standard is a wireless data network standard according to a IEEE 802standard protocol, and wherein said EP1 is an encryption parameter referred to as a COUNT C parameter according to the 3GPP standard, said method further comprising the following steps:
   setting up a data session wherein the data is transmitted over a cellular radio network transmission path through said first data port according to the 3GPP standard,
   encrypting the data of said session by using an f8-algorithm defined by the 3GPP standard, setting up an alternative radio bearer identity, ARB ID 1, having a bit number value and defining a logical connection for said data session over an alternative network path according to said alternative transmission protocol standard, defining a second alternative encryption parameter, AEP2, as being a function of said value of ARB ID 1, and having a bit length being equal with a second encryption parameter, EP2, of said first set of encryption parameters, referred to as a BEARER parameter according to the 3GPP standard, performing a handover of said data session from said cellular radio network transmission path to said alternative transmission path wherein each frame is assigned a transmitter send sequence number N, and data is transmitted through said second data port, defining said AFSN to be said N, calculating said AHYPFSN by detecting the triggering of consecutive alternative hyper-frames, defining said AEP1 as being a combination of said AFSN and AHYPFSN, and, forming a second set of encryption parameters by substituting said EP1 with said AEP1 and substituting said EP2 with said AEP2 in said first set of encryption parameters, forming said alternative encryption key bit stream, AEKS, by feeding said f8 algorithm with said second set of encryption parameters.

6. The method according to claim 1 wherein said first transmission protocol, said encryption algorithm and said first set of encryption parameters are defined according to the 3GPP standard, and said alternative transmission protocol is a secure IP standard protocol, IPSec, the method further comprising the step of:

defining said ANR as being a function of a conventional IP-packet sequence number parameter, ESP-NR, residing in an IP Encapsulating Security Payload header, ESP header, wherein said header and ESP-NR are defined by the IPSec standard protocol.

7. The method according to claim 6 further comprising the following steps:

setting up a data session connection wherein said data is transmitted over a cellular radio network path through said first data port, defining a second alternative encryption parameter, AEP2, having the same bit length as a second conventional f8 encryption parameter, EP2, performing a handover of said data session from said cellular radio network transmission path to said alternative transmission path, transmitting data through said second data port, segmenting said data in IPSec packet format and assigning each packet the ESP-NR parameter value according to the IPSec standard protocol, defining said AEP1 to be said ESP-NR, and, encrypting said data by substituting a 3GPP COUNT-C encryption parameter, EP1, with said AEP1, and substituting a 3GPP BEARER encryption parameter, EP2, with said AEP2, in said f8-algorithm.

8. The method according to claim 7 comprising the step of:

setting up an alternative radio bearer identity, ARB ID 1, having a bit number value and defining a logical connection for said data session over the alternative network path according to said alternative transmission protocol standard, and defining the second alternative encryption parameter, AEP2, to be a function of said ARB ID 1.

9. The method according to claim 7 comprising the step of:

defining said AEP2 as being a function of a conventional SPI (Secure Parameter Index) parameter value defined by the IPSec standard protocol.

10. The method according to claim 1 wherein said ciphering parameters is a first set of encryption parameters which further comprises the following encryption parameters:

EP3, referred to as a DIRECTION parameter according to the 3GPP standard,

EP4, referred to as a LENGTH parameter according to the 3GPP standard,

EP5, referred to as a cipher key parameter according to the 3GPP standard, said method further comprising the steps of:

defining a third alternative encryption parameter AEP3 to equal said EP3, defining a fourth alternative encryption parameter AEP4 to equal said EP4, defining a fifth alternative encryption parameter AEP5 to equal said EP5, forming said second set of encryption parameters by substituting said EP3 with said AEP3, said EP4 with said AEP4, said EP5 with said AEP5, in said first set of encryption parameters.

11. The method according to claim 1 wherein said data ciphering method is an authentication ciphering method; said device being arranged to form a ciphering digest from a first Radio Resource Control, RRC, message by feeding an authentication ciphering algorithm with said RRC message and a first set of authentication ciphering parameters, comprising a first authentication ciphering parameter, AP1, having a bit length, BLAP1, wherein said digest indicates the authentication of said first RRC message and wherein said first RRC message, said authentication ciphering algorithm and said first set of authentication ciphering parameters are defined by a first cellular radio network protocol; said device being arranged to transmit said digest along with said first RRC message according to said first cellular radio network protocol through said first data port; said device being further arranged to receive an alternative RRC message defined by an alternative transmission protocol through said second port, said method characterised in that it comprises the following steps:

associating said alternative RRC message with an alternative message sequence number, AMSNR, defining at least one alternative ciphering parameter, AAP1, as being a function of said AMSNR and having a bit length being equal with said BLAP1, forming a second set of authentication ciphering parameters by substituting said AP1 with said AAP1 in said first set of authentication parameters, forming an alternative digest associated with said alternative RRC message by feeding said authentication ciphering algorithm with said second set of authentication ciphering parameters, and, transmitting said alternative RRC message along with said alternative digest through said second data port according to said alternative transmission protocol.

12. The method according to claim 11 wherein said first transmission protocol is a 3GPP standard protocol, said authentication ciphering algorithm is an f9 algorithm defined by the 3GPP standard, said authentication ciphering parameters are defined according to the 3GPP standard, and wherein said AP1 is a parameter referred to as a COUNT-I parameter according to the 3GPP standard, and wherein said alternative protocol is an IEEE 802 standard protocol or an IP Sec standard protocol, said method further comprising the steps of:

defining a second alternative authentication ciphering parameter AAP2 to equal a second 3GPP authentication parameter AP2 referred to as a FRESH parameter according to 3GPP, defining a third alternative authentication ciphering parameter AAP3 to equal a third 3GPP authentication parameter AP3 referred to as a DIRECTION parameter according to 3GPP, defining a fourth alternative authentication ciphering parameter AAP4 to equal a signalling message defined at least by said alternative transmission protocol, defining a fifth alternative authentication ciphering parameter AAP5 to equal a fifth 3GPP authentication parameter AP5 referred to as an integrity key (IK) parameter according to 3GPP, forming said second set of authentication ciphering parameters by substituting said AP2 with said AAP2, said AP3 with said AAP3, said AP4 with said AAP4, said AP5 with said AAP5, in said first set of encryption parameters.

* * * * *

UNITED STATES PATENT AND TRADEMARK OFFICE
CERTIFICATE OF CORRECTION

PATENT NO.        : 7,961,875 B2
APPLICATION NO.   : 11/914292
DATED             : June 14, 2011
INVENTOR(S)       : Sachs et al.

It is certified that error appears in the above-identified patent and that said Letters Patent is hereby corrected as shown below:

In Column 4, Line 22, delete "f-algorithm." and insert -- f8-algorithm. --, therefor.

In Column 4, Line 32, delete "SP1" and insert -- SPI --, therefor.

In Column 6, Lines 48-50, delete "FIG. 6 ........ FIG. 5." and insert the same as a new paragraph.

In Column 11, Line 25, delete "XAC," and insert -- XMAC, --, therefor.

In Column 13, Line 28, delete "BFN" and insert -- HFN --, therefor.

In Column 14, Line 7, delete "AC-I" and insert -- XMAC-I --, therefor.

In Column 15, Line 67, delete "ABP1" and insert -- AEP1 --, therefor.

In Column 17, Line 13, delete "fall" and insert -- full --, therefor.

In Column 21, Line 19, delete "LAAP-ADD" and insert -- IAAP-ADD --, therefor.

In Column 21, Line 53, delete "APP-ADD" and insert -- IAPP-ADD --, therefor.

In Column 24, Lines 24-30, delete "In one ....... 930" and insert the same at Line 23, after "blind to.", as a continuation of the paragraph.

In Column 36, Line 14, in Claim 1, delete "processinq" and insert -- processing --, therefor.

In Column 36, Line 16, in Claim 1, delete "alqorithm" and insert -- algorithm --, therefor.

In Column 36, Line 17, in Claim 1, delete "comprisinq" and insert -- comprising --, therefor.

Signed and Sealed this
Fourteenth Day of February, 2012

David J. Kappos
*Director of the United States Patent and Trademark Office*

In Column 36, Line 19, in Claim 1, delete "defininq" and insert -- defining --, therefor.

In Column 36, Line 20, in Claim 1, delete "beinq" and insert -- being --, therefor.